United States Patent
Gallant et al.

(10) Patent No.: US 12,009,499 B2
(45) Date of Patent: Jun. 11, 2024

(54) ELECTROCHEMICAL CONVERSION OF HALOGENATED COMPOUNDS AND ASSOCIATED SYSTEMS

(71) Applicant: Massachusetts Institute of Technology, cAMBRIDGE, MA (US)

(72) Inventors: Betar Gallant, Cambridge, MA (US); Yuanda Li, Cambridge, MA (US); Aliza Khurram, Cambridge, MA (US); Mingfu He, Quincy, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/969,486

(22) Filed: Oct. 19, 2022

(65) Prior Publication Data
US 2023/0052497 A1 Feb. 16, 2023

Related U.S. Application Data

(62) Division of application No. 16/338,947, filed as application No. PCT/US2017/054893 on Oct. 3, 2017, now Pat. No. 11,522,241.
(Continued)

(51) Int. Cl.
*H01M 12/06* (2006.01)
*H01M 4/38* (2006.01)
(Continued)

(52) U.S. Cl.
CPC ......... *H01M 12/06* (2013.01); *H01M 4/382* (2013.01); *H01M 4/582* (2013.01);
(Continued)

(58) Field of Classification Search
CPC ...... H01M 12/06; H01M 4/382; H01M 4/582; H01M 4/8605; H01M 4/40; H01M 4/46; H01M 6/14; H01M 12/04
(Continued)

(56) References Cited

U.S. PATENT DOCUMENTS

| | | | |
|---|---|---|---|
| 3,325,318 A | 6/1967 | Pauliukonis | |
| 3,345,277 A | 10/1967 | Ashley et al. | |

(Continued)

FOREIGN PATENT DOCUMENTS

| | | |
|---|---|---|
| CA | 2865636 A1 | 5/2015 |
| CN | 107749492 A1 | 3/2018 |

(Continued)

OTHER PUBLICATIONS

International Search Report and Written Opinion mailed Dec. 12, 2017, for Application No. PCT/US2017/054893.
(Continued)

*Primary Examiner* — Jonathan G Jelsma
*Assistant Examiner* — Omar M Kekia
(74) *Attorney, Agent, or Firm* — Wolf, Greenfield & Sacks, P.C.

(57) ABSTRACT

Methods and systems for the electrochemical conversion of halogenated compounds are provided. In some embodiments, a method comprises converting a halogenated compound (e.g., fluorinated gas) to relatively non-hazardous products via one or more electrochemical reactions. The electrochemical reaction(s) may occur under relatively mild conditions (e.g., low temperature) and/or without the aid of a catalyst. In some embodiments, the electrochemical reaction may produce a relatively large amount of energy. In some such cases, systems, described herein, may be designed to facilitate the conversion of the halogenated compound (e.g., $SF_6$, $NF_3$) while harnessing (e.g., storing, converting) the energy associated with the electrochemical reaction. System and methods described herein may be used in a wide variety of applications, including waste management (e.g., environmental remediation, greenhouse gas mitigation), energy recovery (e.g., industrial energy recovery), and primary batteries (e.g., metal-gas batteries).

25 Claims, 17 Drawing Sheets

Related U.S. Application Data

(60) Provisional application No. 62/556,180, filed on Sep. 8, 2017, provisional application No. 62/403,352, filed on Oct. 3, 2016.

(51) Int. Cl.
| | |
|---|---|
| *H01M 4/58* | (2010.01) |
| *H01M 4/86* | (2006.01) |
| *H01M 4/40* | (2006.01) |
| *H01M 4/46* | (2006.01) |
| *H01M 6/14* | (2006.01) |
| *H01M 12/04* | (2006.01) |

(52) U.S. Cl.
CPC ............ *H01M 4/8605* (2013.01); *H01M 4/40* (2013.01); *H01M 4/46* (2013.01); *H01M 6/14* (2013.01); *H01M 12/04* (2013.01)

(58) Field of Classification Search
USPC .......................................................... 429/402
See application file for complete search history.

(56) References Cited

U.S. PATENT DOCUMENTS

| | | | |
|---|---|---|---|
| 3,459,596 A | 8/1969 | Lord et al. | |
| 3,573,987 A | 4/1971 | Knight | |
| 4,959,566 A | 9/1990 | Dobran | |
| 6,416,726 B2 | 7/2002 | Izumikawa et al. | |
| 8,535,834 B1 | 9/2013 | Yoon | |
| 11,453,948 B2 | 9/2022 | Gallant et al. | |
| 2009/0280410 A1 | 11/2009 | Zaguib et al. | |
| 2013/0327648 A1* | 12/2013 | Grant .................... | C25D 3/665 205/59 |
| 2016/0336623 A1 | 11/2016 | Nayar et al. | |
| 2016/0351886 A1* | 12/2016 | Braun ................ | H01M 4/1395 |
| 2017/0288281 A1 | 10/2017 | Chiang et al. | |
| 2019/0348672 A1 | 11/2019 | Wang et al. | |
| 2020/0071835 A1 | 3/2020 | Gallant et al. | |
| 2021/0028522 A1 | 1/2021 | Gallant et al. | |
| 2021/0057723 A1 | 2/2021 | Gallant et al. | |

FOREIGN PATENT DOCUMENTS

| | | |
|---|---|---|
| GB | 2101394 B | 1/1983 |
| WO | WO 2016/094551 A1 | 6/2016 |
| WO | WO 2018/067533 A1 | 4/2018 |

OTHER PUBLICATIONS

International Preliminary Report on Patentability mailed Apr. 18, 2019, for Application No. PCT/US2017/054893.
Andersson et al., Electrochemically lithiated graphite characterised by photoelectron spectroscopy. J Power Sources. 2003;119, 522-527. doi:10.1016/S0378-7753(03)00277-5.
Andrieux et al., Outer-sphere dissociative electron transfer to organic molecules: a source of radicals or carbanions? Direct and indirect electrochemistry of perfluoroalkyle bromides and iodides. J. Am. Chem. Soc. 1990; 112: 3509-20.
Aurbach et al., Identification of Surface-Films Formed on Lithium in Propylene Carbonate Solutions. J Electrochem Soc 134, 1611-1620, doi:Doi 10.1149/1.2100722 (1987).
Aurbach et al., Recent Studies of the Lithium Liquid Electrolyte Interface—Electrochemical, Morphological and Spectral Studies of a Few Important Systems. J Power Sources. 1995;54, 76-84, doi:Doi 10.1016/0378-7753(94)02044-4.
Aurbach et al., Recent studies on the correlation between surface chemistry, morphology, three-dimensional structures and performance of Li and Li—C intercalation anodes in several important electrolyte systems. J Power Sources. 1997;68, 91-98, doi:Doi 10.1016/S0378-7753(97)02575-5.
Aurbach et al., The Study of Electrolyte-Solutions Based on Ethylene and Diethyl Carbonates for Rechargeable Li Batteries .1. Li Metal Anodes. J Electrochem Soc 142, 2873-2882, doi:Doi 10.1149/1.2048658 (1995).
Aurbach et al., The Surface-Chemistry of Lithium Electrodes in Alkyl Carbonate Solutions. J Electrochem Soc 141, L1-L3, doi:Doi 10.1149/1.2054718 (1994).
Bates et al., Fabrication and Characterization of Amorphous Lithium Electrolyte Thin-Films and Rechargeable Thin-Film Batteries. J Power Sources 43, 103-110, doi:Doi 10.1016/0378-7753(93)80106-Y (1993).
Burke et al., Electrochemical reduction of sulfur hexafluoride in novel, air-independent power systems. ECS Trans. 2011; 35(33): 3-10.
Cheng et al., A Review of Solid Electrolyte Interphases on Lithium Metal Anode. Adv Sci 3, doi:UNSP 1500213 10.1002/advs.201500213 (2016).
Choudhury et al., A highly reversible room-temperature lithium metal battery based on crosslinked hairy nanoparticles. Nat Commun 6, doi:ARTN 10101 10.1038/ncomms10101 (2015).
Choudhury et al., Lithium Fluoride Additives for Stable Cycling of Lithium Batteries at High Current Densities. Adv Electron Mater 2, doi:ARTN 150024610.1002/aelm.201500246 (2016).
Fong et al., Studies of Lithium Intercalation into Carbons Using Nonaqueous Electrochemical-Cells. J Electrochem Soc 137, 2009-2013, doi:Doi 10.1149/1.2086855 (1990).
Gauthier et al., Electrode-Electrolyte Interface in Li-Ion Batteries: Current Understanding and New Insights. J Phys Chem Lett 6, 4653-4672, doi:10.1021/acs.jpclett.5b01727 (2015).
Harry et al., Detection of subsurface structures underneath dendrites formed on cycled lithium metal electrodes. Nat Mater 13, 69-73, doi:10.1038/Nmat3793 (2014).
He et al., Electrochemical conversion of nitrogen trifluoride as a gas-to-solid cathode in Li batteries. J. Phys. Chem. Letts. Jul. 27, 2018; 9(16): 4700-6.
Jung et al., New iron-based intercalation host for lithium-ion batteries. Chem. Mater. 2018; 30: 1956-64.
Jung et al., Lithium-free transition metal monoxides for positive electrodes in lithium-ion batteries. Nat. Energy. 2017; 2: 16208.
Jung et al., Chemical origins of electrochemical overpotential in surface-conversion nanocomposite cathodes. Adv Energ Mater. 2019; 9: 1900503.
Kanamura et al., Morphology and Chemical-Compositions of Surface-Films of Lithium Deposited on a Ni Substrate in Nonaqueous Electrolytes. J Electroanal Chem 394, 49-62, doi:Doi 10.1016/0022-0728(95)03972-J (1995).
Kanamura et al., Xps Analysis for the Lithium Surface Immersed in Gamma-Butyrolactone Containing Various Salts. Electrochim Acta 40, 913-921, doi:Doi 10.1016/0013-4686(93)E0020-M (1995).
Kanamura et al., Xps Analysis for the Lithium Surface Immersed in Tetrahydrofuran Containing Various Salts. Denki Kagaku 61, 1377-1382 (1993).
Kanamura et al., Xps Analysis of a Lithium Surface Immersed in Propylene Carbonate Solution Containing Various Salts. J Electroanal Chem 333, 127-142, doi:Doi 10.1016/0022-0728(92)80386-I (1992).
Kanamura et al., Xps Analysis of Lithium Surfaces Following Immersion in Various Solvents Containing Libf4. J Electrochem Soc 142, 340-347, doi:Doi 10.1149/1.2044000 (1995).
Kanno et al., Lithium ionic conductor thio-LISICON—The Li2S—GeS2—P2S5 system. J Electrochem Soc 148, A742-A746, doi:10.1149/1.1379028 (2001).
Khurana et al., Suppression of Lithium Dendrite Growth Using Cross-Linked Polyethylene/Poly(ethylene oxide) Electrolytes: A New Approach for Practical Lithium-Metal Polymer Batteries. J Am Chem Soc 136, 7395-7402, doi:10.1021/ja502133j (2014).
Li et al., Revealing Nanoscale Passivation and Corrosion Mechanisms of Reactive Battery Materials in Gas Environments. Nano Lett 17, 5171-5178, doi:10.1021/acs.nanolett.7b02630 (2017).
Li et al., Lithium-free transition metal monoxides for positive electrodes in lithium-ion batteries. Nat Energy. 2017; 2: 16208.
Lin et al., Conformal Lithium Fluoride Protection Layer on Three-Dimensional Lithium by Nonhazardous Gaseous Reagent Freon.

(56) References Cited

OTHER PUBLICATIONS

Nano Lett. Jun. 14, 2017;17(6):3731-3737. doi: 10.1021/acs.nanolett. 7b01020. Epub May 25, 2017. PMID: 28535068.

Lin et al., Reviving the lithium metal anode for high-energy batteries. Nat Nanotechnol 12, 194-206, doi: 10.1038/Nnano.2017. 16 (2017).

Lu et al., Stable lithium electrodeposition in liquid and nanoporous solid electrolytes. Nat Mater 13, 961-969, doi: 10.1038/Nmat4041 (2014).

Markevich et al., Very Stable Lithium Metal Stripping—Plating at a High Rate and High Areal Capacity in Fluoroethylene Carbonate-Based Organic Electrolyte Solution. Acs Energy Lett 2, 1321-1326, doi:10.1021/acsenergylett.7b00300 (2017).

Momma et al., Effect of the atmosphere on chemical composition and electrochemical properties of solid electrolyte interface on electrodeposited Li metal. J Power Sources 196, 6483-6487, doi:10. 1016/j.jpowsour.2011.03.095 (2011).

Monroe et al., The impact of elastic deformation on deposition kinetics at lithium/polymer interfaces. J Electrochem Soc 152, A396-A404, doi:10.1149/1.1850854 (2005).

Nazri et al., Composition of Surface-Layers on Li Electrodes in Pc, Liclo4 of Very Low Water-Content. J Electrochem Soc 132, 2050-2054, doi:Doi 10.1149/1.2114288 (1985).

Peled et al., Advanced model for solid electrolyte interphase electrodes in liquid and polymer electrolytes. J Electrochem Soc 144, L208-L210, doi:Doi 10.1149/1.1837858 (1997).

Peled et al., The role of SEI in lithium and lithium ion batteries. Mater Res Soc Symp P 393, 209-221 (1995).

Peled, The Electrochemical-Behavior of Alkali and Alkaline-Earth Metals in Non-Aqueous Battery Systems—the Solid Electrolyte Interphase Model. J Electrochem Soc 126, 2047-2051, doi:Doi 10.1149/1.2128859 (1979).

Qian et al. High rate and stable cycling of lithium metal anode. Nat Commun 6, doi:ARTN 636210.1038/ncomms7362 (2015).

Tikekar et al., Design principles for electrolytes and interfaces for stable lithium-metal batteries. Nat Energy 1, 1-7, doi:Artn 16114 10.1038/Nenergy.2016.114 (2016).

Tomita et al., Synthesis and charge-discharge properties of LiF—NiO composite as a cathode material for Li-ion batteries. J. Power Sources. 2016; 329: 406-11.

Wu et al., Electrochemical behaviors of a Li3N modified Li metal electrode in secondary lithium batteries. J Power Sources 196, 8091-8097, doi:10.1016/j.jpowsour.2011.05.035 (2011).

Yan et al. Ultrathin Two-Dimensional Atomic Crystals as Stable Interfacial Layer for Improvement of Lithium Metal Anode. Nano Lett 14, 6016-6022, doi:10.1021/nl503125u (2014).

Zhang et al., Origin of the high capacity manganese-based oxyfluoride electrodes for rechargeable batteries. Chem Mater. 2018; 30(15): 5362-5372.

Zhang et al., Triggering the In Situ Electrochemical Formation of High Capacity Cathode Material from MnO. Adv. Sci. News. 2017; 7: 162200.

Zheng et al. Interconnected hollow carbon nanospheres for stable lithium metal anodes. Nat Nanotechnol. 2014;9, 618-623, doi:10. 1038/Nnano.2014.152.

Gao et al., Controlling fluoride-forming reaction for improved rate capability in lithium-perfluorinated gas conversion batteries. Adv Ener. Mater. Apr. 2019; 9(21): 1900393.

Li et al., A high-capacity lithium-gas battery based on sulfur fluoride conversion. J. Phys. Chem. C. Mar. 2018; 122(13): 7128-38.

\* cited by examiner

ELECTROCHEMICAL CONVERSION OF HALOGENATED COMPOUNDS AND ASSOCIATED SYSTEMS

RELATED APPLICATIONS

This application is a divisional of U.S. patent application Ser. No. 16/338,947, filed Apr. 2, 2019, entitled "ELECTROCHEMICAL CONVERSION OF HALOGENATED COMPOUNDS AND ASSOCIATED SYSTEMS", which a national stage filing under 35 U.S.C. § 371 of International Patent Application Serial No. PCT/US2017/054893, filed Oct. 3, 2017, entitled "ELECTROCHEMICAL CONVERSION OF HALOGENATED COMPOUNDS AND ASSOCIATED SYSTEMS", which claims priority under 35 U.S.C. § 119(e) to U.S. Provisional Patent Application Ser. No. 62/403,352, filed Oct. 3, 2016, and entitled "ELECTROCHEMICAL REACTION AND SYSTEM FOR CONVERSION OF SULFUR HEXAFLUORIDE", and U.S. Provisional Patent Application Ser. No. 62/556,180, filed Sep. 8, 2017, and entitled "ELECTROCHEMICAL CONVERSION OF HALOGENATED COMPOUNDS AND ASSOCIATED SYSTEMS", each of which are incorporated herein by reference in their entirety for all purposes.

TECHNICAL FIELD

Methods and systems for the electrochemical conversion of halogenated compounds are generally described.

BACKGROUND

Addressing the continued demand for electrochemical energy systems with high energy density will require advances in the chemistries and mechanisms of energy conversion. In recent years, a focus on electric vehicles has placed an emphasis on rechargeable batteries that have a relatively high energy density, such as lithium ion batteries. However, many applications require features that cannot be met by current high energy density rechargeable batteries, such as long-term, safe storage in the charged state and rapid startup in situations where charging is difficult or impossible. Examples include military and space applications, backup power supplies, and undersea and remote operations of devices and vehicles. To this end, commercialized primary lithium-based batteries such as Li-thionyl chloride (Li—$SOCl_2$), Li—$MnO_2$, Li—$SO_2$, and Li-carbon monofluoride (Li—$CF_x$) have played an essential role, with packaged energy densities ranging from 200-600 Wh/$kg_{cell}$. However, maturation of these technologies has resulted in a tapering off of energy density gains in recent years. Accordingly, improved compositions and methods are needed.

SUMMARY

Methods and systems for the electrochemical conversion of halogenated compounds are provided. The subject matter of the present invention involves, in some cases, interrelated products, alternative solutions to a particular problem, and/or a plurality of different uses of one or more systems and/or articles.

In one set of embodiments, systems are provided. In one embodiment, a system comprises an anode, a porous cathode, an electrolyte, and a halogenated compound, wherein the halogenated compound is a gas at standard temperature and pressure.

In another set of embodiments, sealed electrochemical cells are provided. In one embodiment, a sealed electrochemical cell comprises an anode comprising an alkali metal, a cathode, an electrolyte, and a halogenated compound, wherein the halogenated compound is a gas at standard temperature and pressure.

In one set of embodiments, methods are provided. In one embodiment, a method comprises, in an electrochemical cell, reacting a fluorinated compound with a metal under suitable conditions to form a metal fluoride, wherein the fluorinated compound is a gas at standard temperature and pressure and the metal has a standard reduction potential of less than or equal to about −1.4 V versus the standard hydrogen electrode.

In another embodiment, a method comprises, at an electrified interface, reacting a fluorinated compound with a metal under suitable conditions to form a metal fluoride, wherein the fluorinated compound is a gas at standard temperature and pressure and the metal has a standard reduction potential of less than or equal to about −1.4 V versus the standard hydrogen electrode.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
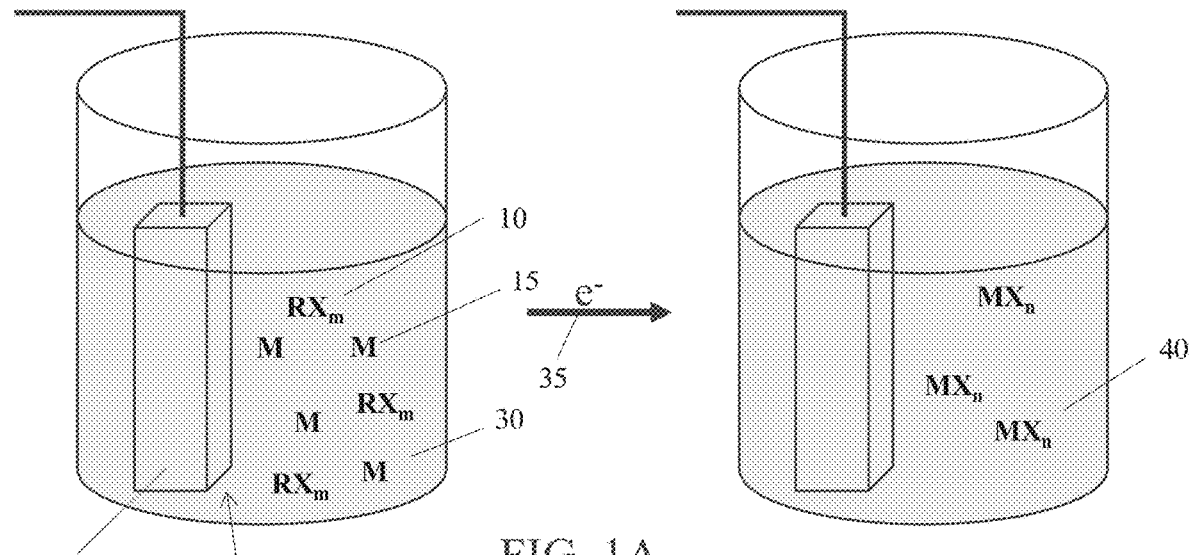
FIG. 1A shows a schematic of a chemical reaction, according to one set of embodiments.

Methods and systems for the electrochemical conversion of halogenated compounds are provided. In some embodiments, a method comprises converting a halogenated compound (e.g., fluorinated gas) to relatively non-hazardous products via one or more electrochemical reactions. The electrochemical reaction(s) may occur under relatively mild conditions (e.g., low temperature) and/or without the aid of a catalyst. In some embodiments, the electrochemical reaction may produce a relatively large amount of energy. In some such cases, systems, described herein, may be designed to facilitate the conversion of the halogenated compound (e.g., $SF_6$, $NF_3$) while harnessing (e.g., storing, converting) the energy associated with the electrochemical reaction. System and methods described herein may be used in a wide variety of applications, including waste management (e.g., environmental remediation, greenhouse gas mitigation), energy recovery (e.g., industrial energy recovery), and primary batteries (e.g., metal-gas batteries).

Concerns regarding global climate change coupled with increased energy consumption have galvanized the search for both sustainable waste management systems and alternative energy conversion and power delivery systems. Much attention has focused on the management of halogenated waste, such as perfluorinated gas. Although halogenated compounds are widely used in industry and society, certain halogenated compounds pose a significant environmental and/or health hazard if released into the environment. For example, certain fluorinated gases (e.g., sulfur hexafluoride, nitrogen trifluoride) are potent greenhouse gases and certain chlorofluorocarbons are believed to cause ozone depletion. Thus, proper management of waste containing hazardous halogenated compound is paramount. However, many existing methods for waste management of certain hazardous halogenated compounds are energy, time, and/or cost intensive limiting the utility and/or sustainability of these methods. For instance, the destruction of $SF_6$ for environmental mitigation often requires aggressive chemical approaches, such as plasma burners, high temperatures, and expensive catalyst, and/or results in toxic reaction products and/or byproducts that must undergo additional waste treatment steps. Accordingly, improved methods and systems for waste management of certain halogenated compounds are needed.

Recent efforts have focused on the use of batteries (e.g., lithium batteries) as alternative energy conversion and power delivery systems. While certain metal-ion batteries (e.g., lithium-ion batteries) have been shown to have a high energy density and efficiency, certain applications require batteries with much higher energy density and/or features that cannot be met by certain metal-ion batteries (e.g., such as long-term, safe storage). Existing approaches to address this deficiency include the use of metal-gas batteries (e.g., lithium-air batteries) as well as certain conventional primary batteries. Many conventional primary batteries have relatively low energy densities (e.g., 200-600 Wh/$kg_{cell}$) that are insufficient to meet the growing energy demand. Many existing metal-gas batteries, which use the oxidation of a metal (e.g., lithium) at the anode and the reduction of the gas (e.g., oxygen) at the cathode to induce current flow, suffer from significant problems that substantially limit the energy density, lifetime, and/or utility of these batteries. Accordingly, improved energy conversion and power delivery systems and methods are needed.

The inventors have discovered that certain halogenated compounds (e.g., perfluorinated gases) can be electrochemically converted to non-hazardous products under relatively mild conditions with minimal or no formation of hazardous products. In certain embodiments, as described in more detail below, certain halogenated compounds (e.g., $SF_6$, $NF_3$) that have relatively low reactivity and/or are generally considered inert under mild conditions may be electrochemically converted using the methods and systems described herein. Without being bound by theory, it is believed that the use of certain reactants (e.g., having a certain reduction potential), thermodynamically favored reactions, non-reactive reagents, certain electrodes, reaction conditions (e.g., pressure of greater than or equal to about 1 atm) and/or certain electrochemical reactions contribute to the facile conversion (e.g., electrochemical conversion) of these halogenated compounds. The inventors have also discovered systems in which the energy associated with the electrochemical conversion of certain halogenated compound can be harnessed and used in energy conversion systems. In certain embodiments, these energy conversion systems have significantly higher energy densities than some conventional primary batteries. The method and systems, described herein, do not suffer from one or more limitations of existing methods and systems for waste management and energy conversion.

In one aspect, methods for the conversion of halogenated compounds are provided. A non-limiting example of the conversion of a halogenated compound is shown in FIG. 1A. In some embodiments, as illustrated in FIG. 1A, the method may comprise reacting a halogenated compound 10 (e.g., fluorinated compound) with a metal 15 under suitable conditions to form a metal halide 40. The halogenated compound in FIG. 1A is represented by the formula $RX_m$, wherein X is a halogen (e.g., fluorine), R is an inorganic group (e.g., nitrogen, sulfur) or organic group (e.g., optionally substituted aliphatic group, halogenated aliphatic group, fluorinated aliphatic group, perfluorinated alkyl group), and m is 1-10. The metal in FIG. 1A is represented by the formula M, wherein M is a metal atom (e.g., metal ion). In some embodiments, M is a metal having a standard reduction potential of less than or equal to about −1.4 V versus the standard hydrogen electrode (SHE) (e.g., lithium, sodium, calcium, magnesium, aluminum). In certain embodiments, M is an alkali metal (e.g., lithium, sodium) or an alkaline earth metal (e.g., calcium, magnesium). The metal halide in FIG. 1A is represented by the formula $MX_n$, wherein M and X are as described herein and n is 1-3.

In some embodiments, the reaction may occur at or near an electrified interface 20. As used herein, the term "electrified interface" has its ordinary meaning in the art and may refer to the interface between two dissimilar materials in which an interfacial potential difference exists. For instance, in some embodiments, the electrified interface may be the interface between a first material 25 (e.g., electrode) and second material 30 (e.g., electrolyte), which has a different composition than first material 25. In certain embodiments, the reaction may occur at or near an electrified interface, such as the interface between an electrode (e.g., cathode) and an electrolyte (e.g., electrolyte solution). In some embodiments, the reaction may occur in an electrochemical cell. In some such embodiments, the reaction may occur at or near an electrified interface in an electrochemical cell.

In some embodiments, the reaction between the halogenated compound (e.g., fluorinated compound) and the metal may be a reduction reaction as indicated by arrow 35 and electrons represented by e⁻. In some such embodiments, the reduction reaction may convert one or more atoms (e.g., one atom, two or more atoms, four or more atoms) in the halogenated compound from a first oxidation state to a second oxidation state. The oxidation number of the first oxidation state of the atom may be greater than the oxidation number of the second oxidation state. In some embodiments, the difference between the first oxidation number (i.e., the oxidation number of the first oxidation state) and the second oxidation number (i.e., the oxidation number of the second oxidation state) may be relatively large. For instance, the difference between the first and second oxidation states may be greater than or equal to about 2, greater than or equal to about 3, greater than or equal to about 4, greater than or equal to about 5, or greater than or equal to about 6. In some embodiments, the difference between the first and second oxidation states may be less than or equal to about 12, less than or equal to about 11, less than or equal to about 10, less than or equal to about 9, less than or equal to about 8, or less than or equal to about 7. Combinations of the above-referenced ranges are possible (e.g., greater than or equal to about 2 and less than or equal to about 12, greater than or equal to about 2 and less than or equal to about 10, greater than or equal to about 2 and less than or equal to about 8, greater than or equal to about 3 and less than or equal to about 12, greater than or equal to about 3 and less than or equal to about 10, greater than or equal to about 3 and less than or equal to about 8).

In some embodiments, an atom that is converted from a first oxidation state to a second oxidation state may be a halogenated atom. As used, herein, the term "halogenated atom" refers to an atom that is bound (e.g., covalently, non-covalently) to one or more halogen atoms. In some instances, one or more halogen atoms may be attached to the halogenated atom via a covalent bond. In certain cases, one or more halogen atoms may be attached to the halogenated atom via a non-covalent bond. In general, the halogenated compound may comprise one or more halogenated atoms (e.g., one halogenated atom, two or more halogenated atoms, three or more halogenated atoms, four or more halogenated atoms, five or more halogenated atoms).

In some embodiments, the conversion of the halogenated atom from the first oxidation state to the second oxidation state may result in the removal of one or more halogen atoms (e.g., two or more halogen atoms, three or more halogen atoms, four or more halogen atoms, five or more halogen atoms, six or more halogen atoms, all halogen atoms) attached (e.g., covalently, non-covalently) to the halogenated atom. For example, the change in oxidation state may result in the cleavage of one or more halogenated atom-halogen bonds (e.g., two or more cleavages, three or more cleavages, four or more cleavages, six or more cleavages, cleavage of all halogenated atom-halogen bonds). In certain embodiments, the change in oxidation state may result in the conversion of the halogenated atom to a non-halogenated atom. For instance, the change in oxidation state may covert an atom bound to one or more halogen atoms into an atom that is not bound to an halogen atom. For example, change in the oxidation state of the sulfur atom in sulfur hexafluoride from $S^{6+}$ to $S^{2-}$ may result in the cleavage of all six sulfur-fluorine bonds.

In some embodiments, cleavage of a halogenated atom-halogen bond may result in the formation of a charged halogen atom. The charged halogen atom may react with a metal atom (e.g., metal ion) to form metal halide (e.g., $MX_n$) 40. In some such embodiments, the reduction reaction comprises the transfer of electrons to the halogenated atom, loss of one or more halogen atoms from the halogenated atom, and/or formation of a metal halide. In some embodiments, the metal that reacts with the halogen atom(s) may be selected, such that the reaction between the metal and the halogen atom(s) is an exergonic reaction. Without being bound by theory, it is believed that the exergonic reaction facilitates the electrochemical reaction and minimizes the presence of potential hazardous reaction products, such as fluoride ions.

Regardless of whether a metal halide (e.g., metal fluoride) is formed, in some embodiments in which the reduction reaction converts one or more atoms in the halogenated compound from a first oxidation state to a second oxidation state, the atom(s) in the second oxidation state may form one or more chemical bonds (e.g., covalent bond, non-covalent bond). In some embodiments, the atom(s) in the second oxidation state may form a chemical bond with one or more metal atoms. In some such embodiments, the atom(s) in the second oxidation state and metal may form an electrostatic bond. In some such cases, the metal atom(s) may be a metal cation and the atom(s) in the second oxidation state may be an anion. In some embodiments, the atom(s) in the second oxidation state may form a chemical bond (e.g., covalent bond) with another atom in the second oxidation state. For example, nitrogen trifluoride may be reduced to form nitrogen molecules and fluorine molecules. The nitrogen molecules may react with one another to form nitrogen gas (i.e., $N_2$).

In some embodiments, the reduction reaction may produce reaction products in the solid or gaseous state. In some such embodiments, the production of solid or gaseous reaction products may facilitate isolation and collection of the reaction products.

Figure 1B:
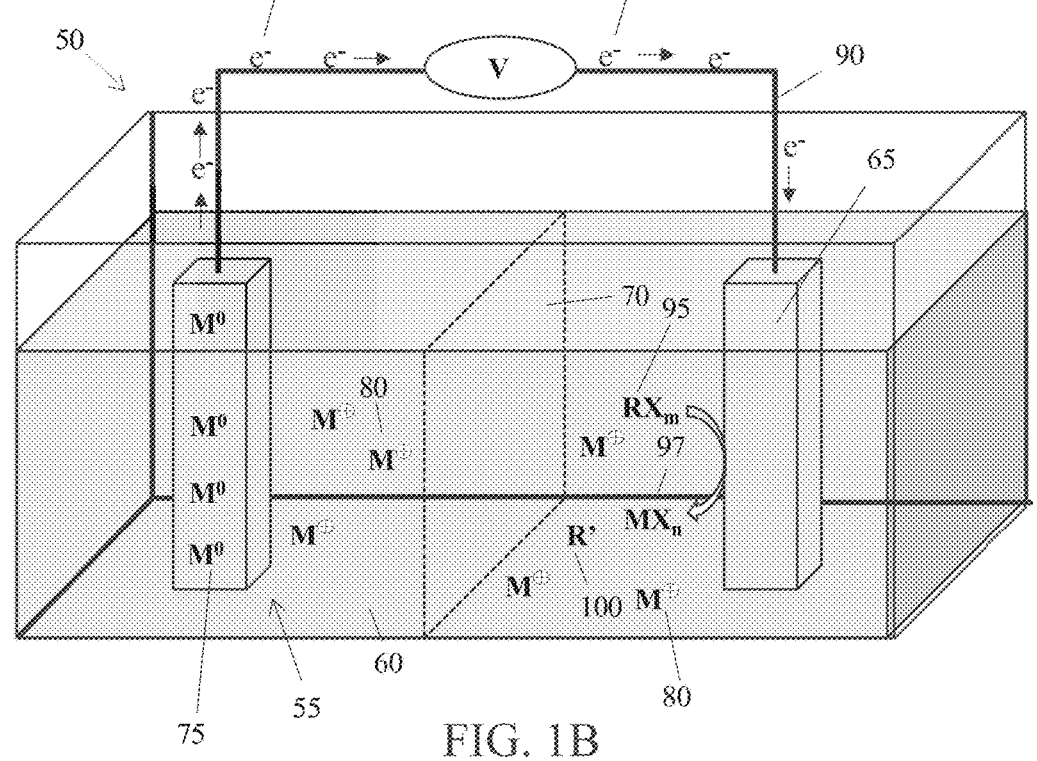
FIG. 1B shows a schematic of an electrochemical reaction, according to one set of embodiments.

As described herein, the halogenated compound may undergo an electrochemical reaction to form one or more non-hazardous reaction products. The electrochemical reaction may occur in a galvanic electrochemical cell. A non-limiting example of the electrochemical conversion of a halogenated compound in a galvanic cell is shown in FIG. 1B. In some embodiments, a galvanic electrochemical cell 50 may comprise an anode 55, an electrolyte 60, and a cathode 65. The anode may be in ionic communication with the cathode, such that ions may move from the anode to cathode. In some embodiments, the anode and cathode may be mechanically and/or electrically isolated from one another (e.g., in separate containers). In certain embodiments, the galvanic electrochemical cell may optionally comprise a separator 70 that serves to mechanically and/or electrically isolate the anode from the cathode, while allowing for ionic conduction. Anode 55 and cathode 65 may be electrically connected via a conductive pathway 90.

In some embodiments, an oxidation reaction may occur at or near the electrified interface formed between the anode and the electrolyte. The anode may comprise a metal 75. The metal may be in the neutral state as indicated by M°. In some embodiments, the metal and/or anode may have a standard reduction potential of less than or equal to about −1.4 V versus the standard hydrogen electrode (SHE). In some such embodiments, the anode may comprise lithium, sodium, calcium, magnesium, aluminum, or combinations thereof. In certain embodiments, the anode may comprise an alkali metal (e.g., lithium, sodium) and/or an alkaline earth metal (e.g., calcium, magnesium). In certain embodiments, the anode may comprise an alkali metal (e.g., lithium, sodium). In some embodiments, metal 75 may undergo an oxidation reaction (e.g., lose electrons) to form metal cations 80. At least a portion of metal cations 80 may travel to the cathode.

The electrons 85 released from metal 75 may travel along conductive pathway 90 connecting the anode to the cathode. Electrons 85 flow into cathode 65 and reduce halogenated compound 95, as described herein, at or near the electrified interface formed by the cathode and the electrolyte. The reduction reaction may result in the change in oxidation state of an atom in R and the cleavage of one or more R—X bonds. The cleavage of a R—X bond may result in the formation of X in ionic form (e.g., anionic form). In some embodiments, X may react with metal cation 80, generated from the oxidation reaction at the anode, to form a metal halide 97. In other embodiments, X may react with a metal cation derived from the electrolyte to form a metal halide. In some embodiments, the electrolyte may contain the same metal cation that is produced at the anode. In certain embodiments, the electrolyte may have comprise a metal cation having similar chemical properties as the metal cation produced at the anode. For instance, the electrolyte may comprise a metal cation having the same oxidation number as metal cation 80.

In some embodiments, regardless of whether a metal halide is formed, the atom in R having undergone a change in oxidation state may optionally undergo one or more reactions to from a reaction product 100, represented by R'.

Figure 1C:
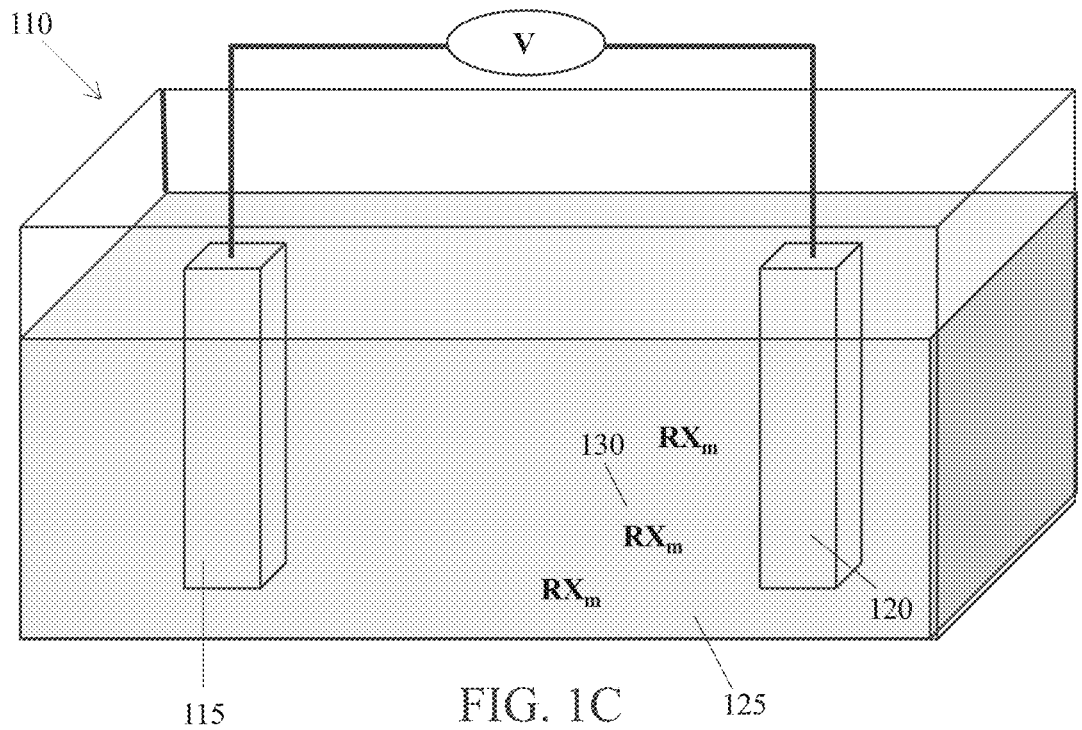
FIG. 1C shows an electrochemical system, according to one set of embodiments.
Figure 1D:
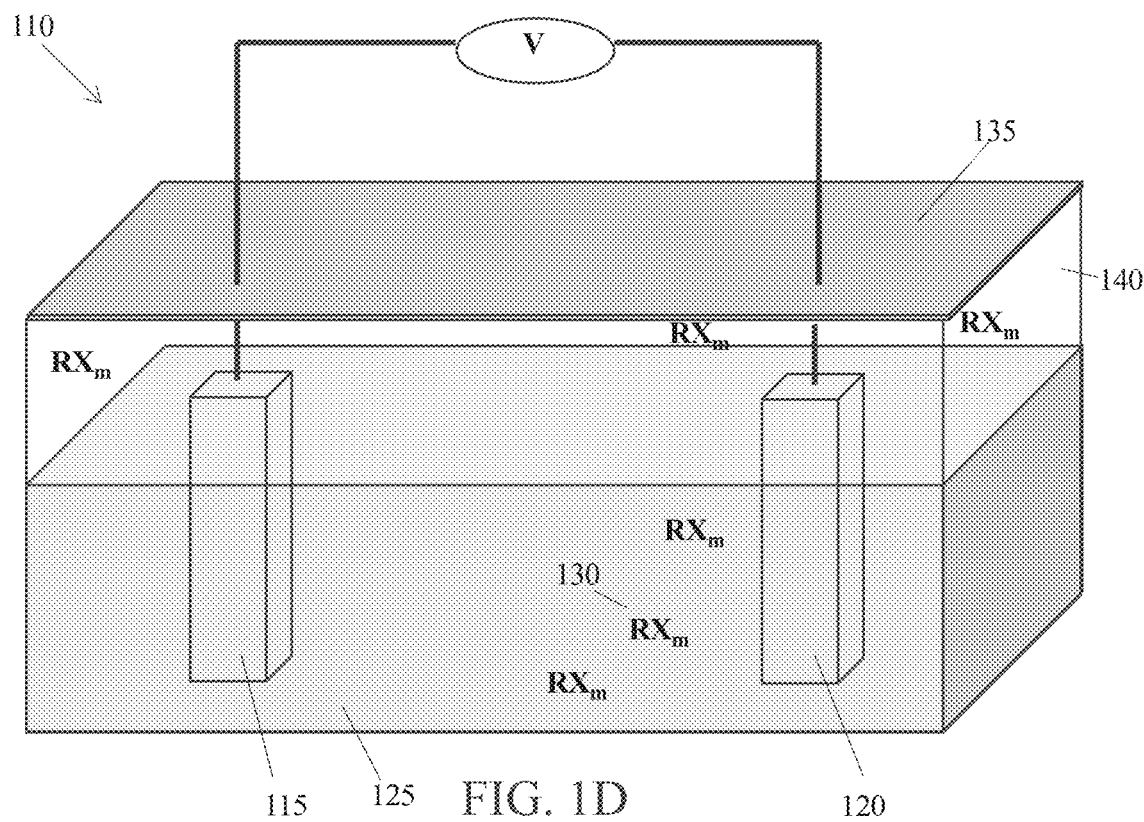
FIG. 1D shows a closed electrochemical system, according to one set of embodiments.

In another aspect, systems are provided. As noted above, a system may be designed to harness the energy associated with the electrochemical conversion of a halogenated compound. In such cases, the halogenated compound may serve as a reactant during use of the system and may be contained in the system prior to first use (e.g., in a pressurized state). Non-limiting examples of such a system are shown in FIGS. 1C-1D. In some embodiments, a system 110 (e.g., energy conversion system, primary battery) may comprise an anode 115, a cathode 120, an electrolyte 125, and the halogenated compound 130 as illustrated in FIGS. 1C-1D. In some embodiments, cathode 120 may be porous and/or have a relatively high void volume (e.g., greater than or equal to about 40%). In some such embodiments, the cathode may have a relatively high surface area. In other embodiments, the cathode may be planar. In some embodiments, the anode may comprise a passivation layer. The passivation layer may serve to prevent side reactions between the metal in the anode and other components in the system (e.g., electrolyte, halogenated compound). In some embodiments, in which the halogenated compound is a gas (e.g., fluorinated gas, perfluorinated gas) at the operating temperature and pressure of system 110, the system may be a closed system with respect to fluid (e.g., gas, liquid) transfer. For example, as illustrated in FIG. 1D, the system may comprise a seal 135 that prevents fluid exchange with the outside environment. In certain embodiments, at least a portion of the gaseous halogenated compound may be dissolved in the electrolyte.

In some embodiments, the electrolyte may be in fluid communication with a source of the halogenated compound. For instance, in some embodiments, in which the halogenated compound is a gas at the operating temperature and pressure of system 110, the electrolyte may be in fluid communication with a source of the halogenated gas. For example, system 110 may comprise a gaseous headspace 140. Gaseous headspace 140 can be positioned above electrolyte 125 in system 110. In certain embodiments, gaseous headspace 140 and electrolyte 125 are in direct contact. In certain embodiments, the gaseous headspace may comprise the gaseous halogenated compound. In other embodiments, in which system 110 comprises a gaseous headspace, the headspace may not contain the gaseous halogenated compound.

In some embodiments, in which system 110 comprises a gaseous headspace, the partial pressure of the gaseous halogenated compound in gaseous headspace 140 may be used to control the concentration of the halogenated compound in the electrolyte prior to, during, and/or after use of the system (e.g., electrochemical cell, battery). For example, the concentration of dissolved gaseous halogenated compound in the electrolyte may be adjusted by increasing or decreasing the partial pressure of the halogenated compound in the gaseous headspace. In some embodiments, the concentration of the gaseous halogenated compound in the headspace may be maintained at a level that allows the gaseous halogenated compound to be transported from headspace 140 to electrolyte 125 prior to, during, and/or after use of the system. The rate of delivery of the gaseous halogenated compound from gaseous headspace 140 to electrolyte 125 and/or the equilibrium concentration of the gaseous halogenated compound in the electrolyte can be adjusted, for example, by adjusting the partial pressure of the gaseous halogenated compound within gaseous headspace 140. This can be achieved, for example, by transporting gas into gaseous headspace 140 containing more or less of the gaseous halogenated compound than is present within the gaseous headspace. Accordingly, in certain embodiments, system 110 is in fluid communication with a source of the gaseous halogenated compound. Any suitable source, such as a gas tank, may be used. In certain embodiments, the source of the gaseous halogenated compound can contain substantially pure gaseous halogenated compound (e.g., at least about 80% gaseous halogenated compound, at least about 90% gaseous halogenated compound, at least about 95% gaseous halogenated compound, or at least about 99% gaseous halogenated compound). In other embodiments, the gas source may comprise the gaseous halogenated compound mixed with one or more other gases that can be used in system 110, such as an inert gas (e.g., helium, argon, nitrogen).

In some embodiments, system 110 may be a device that converts chemical energy into electrical energy (e.g., primary battery). In some such embodiments, a least a portion of the chemical energy in system 110 may be derived from the halogenated compound. For instance, system 110 may be a metal-gas battery (e.g., primary battery metal-gas), that uses the oxidation of a metal, as described herein, at the anode and the reduction of the halogenated gas (e.g., fluorinated gas, perfluorinated gas) at the cathode to induce current flow. In some such embodiments, the electrolyte composition may be tailored to have a relatively high solubility of the halogenated gas and/or reaction products (e.g., solid reaction products) derived from the electrochemical conversion of the halogenated gas. In some such cases, the concentration of dissolved halogenated gas in the electrolyte may be relatively high (e.g., greater than or equal to about 1 mM). In certain embodiments, the pressure of the system and/or additives may be used to improve the solubility of the halogenated gas in the electrolyte. In some such embodiments, the concentration of dissolved halogenated gas may be relatively high (e.g., greater than or equal to about 1 mM). In certain embodiments, system 110 may be any suitable device for the management of halogenated waste and/or energy recovery.

As described herein, a halogenated compound may undergo an electrochemical conversion. In general, the halogenated compound may be any suitable compound comprising one or more halogen atoms. In some embodiments, halogenated compound may be a gas at standard temperature and pressure. In some embodiments, halogenated compound may be a gas at 298K and 1 atm. In some cases, the gaseous halogenated compound is a fluorinated gas. In some instances, the fluorinated gas is a perfluorinated gas. In some embodiments, the fluorinated gas is a perfluorocarbon (e.g., carbon tetrafluoride), sulfur hexafluoride, or nitrogen trifluoride. In some embodiments, the gaseous halogenated compound is an inorganic halogenated compound.

As described herein, a halogenated compound may be reacted with a metal. In general, any suitable metal may be used. In certain embodiments, a suitable metal may have a standard reduction potential of less than or equal to about −1.4 V versus the standard hydrogen electrode (SHE). Non-limiting examples of such metals include lithium, sodium, calcium, magnesium, and aluminum. In certain embodiments, the metal may be an alkali metal (e.g., lithium, sodium) or an alkaline earth metal (e.g., calcium, magnesium). In some embodiments, the metal may be in a charged state (e.g., +1, +2, and/or +3).

As described herein, a halogenated compound may be reacted with a metal to form a metal halide. In general, any suitable metal halide may be formed. In some embodiments, the metal used to form the metal halide may have a standard reduction potential of less than or equal to about −1.4 V versus the standard hydrogen electrode (SHE). Non-limiting examples of such metals include lithium, sodium, calcium, magnesium, and aluminum. In certain embodiments, the metal may be an alkali metal (e.g., lithium, sodium) or an alkaline earth metal (e.g., calcium, magnesium). In some embodiments, the halide may be fluoride, chloride, bromide, or iodide. In some cases, the halide is fluoride. Non-limiting examples of metal fluorides include lithium fluoride, sodium fluoride, calcium fluoride, magnesium fluoride, rubidium fluoride, cesium fluoride, francium fluoride, beryllium fluoride, strontium fluoride, barium fluoride, radium fluoride, and aluminum fluoride. In some embodiments the metal fluoride is lithium fluoride, sodium fluoride, calcium fluoride, magnesium fluoride, or aluminum fluoride.

As described herein, a halogenated compound may undergo an electrochemical reaction in an electrochemical cell. In general, the electrochemical reaction will depend on the selection of the halogenated compound, electrolyte, and/or the anode. Several non-limiting examples of electrochemical reactions are provided below. In one example, the halogenated compound is sulfur hexafluoride, the anode comprises lithium, and the electrolyte comprises one or more lithium salts. In some such embodiments, the reaction at the anode may be $8Li \rightarrow 8Li^+ + 8e^-$ and the reaction at the cathode may be $SF_6 + 8e^- + 8Li^+ \rightarrow 6LiF + Li_2S$. In another example, the halogenated compound is sulfur hexafluoride, the anode comprises sodium, and the electrolyte comprises one or more sodium salts. In some such embodiments, the reaction at the anode may be $8Na \rightarrow 8Na^+ + 8e^-$ and the reaction at the cathode may be $SF_6 + 8e^- + 8Na^+ \rightarrow 6NaF + Na_2S$. In one example, the halogenated compound is nitrogen trifluoride, the anode comprises lithium and the electrolyte comprises one or more lithium salts. In some such embodiments, the reaction at the anode may be $6Li \rightarrow 6Li^+ + 6e^-$ and the reaction at the cathode may be $2NF_3 + 6e^- + 6Li^+ \rightarrow 6LiF + N_2(g)$. In another example, the halogenated compound is sulfur hexafluoride, the anode comprises sodium, and the electrolyte comprises one or more sodium salts. In some such embodiments, the reaction at the anode may be $6Na \rightarrow 6Na^+ + 6e^-$ and the reaction at the cathode may be $2NF_3 + 6e^- + 6Na^+ \rightarrow 6NaF + N_2(g)$. One of ordinary skill in the art would understand other electrochemical reactions that may occur based on general knowledge in the field and the description provided herein.

As described herein, a halogenated compound may undergo an electrochemical conversion under suitable conditions. In some embodiments, the conversion may occur under mild conditions (e.g., low temperature, at or near atmospheric pressure). In certain embodiments, one or more chemical reactions (e.g., electrochemical reactions) may occur at a temperature of less than or equal to about 60° C.

(e.g., less than or equal to about 50° C., less than or equal to about 40° C., less than or equal to about 30° C., less than or equal to about 25° C., less than or equal to about 20° C., less than or equal to about 15° C., less than or equal to about 10° C., less than or equal to about 5° C.). In some embodiments, one or more chemical reactions (e.g., electrochemical reactions) may occur at a temperature between about 0° C. and about 60° C., between about 0° C. and about 50° C., between about 0° C. and about 40° C., between about 0° C. and about 30° C., between about 5° C. and about 60° C., between about 10° C. and about 60° C., between about 10° C. and about 40° C., or between about 15° C. and about 30° C.

In certain embodiments, one or more chemical reactions (e.g., electrochemical reactions) may occur at a pressure of less than or equal to about 15 atm (e.g., less than or equal to about 12 atm, less than or equal to about 10 atm, less than or equal to about 8 atm, less than or equal to about 6 atm, less than or equal to about 4 atm, less than or equal to about 2 atm). In some instances, one or more chemical reactions (e.g., electrochemical reactions) may occur at a pressure of greater than or equal to about 1 atm (greater than or equal to about 1 atm, greater than or equal to about 2 atm, greater than or equal to about 3 atm, greater than or equal to about 5 atm, greater than or equal to about 8 atm, greater than or equal to about 10 atm). All combination of the above-referenced ranges are possible (e.g., greater than or equal to about 1 atm and less than or equal to about 15 atm).

In some embodiments, in which a gaseous halogenated compound mixed with one or more other gases (e.g., inert gas), the partial pressure of the halogenated compound in the headspace may be greater than or equal to about 10%, greater than or equal to about 20%, greater than or equal to about 30%, greater than or equal to about 40%, greater than or equal to about 50%, greater than or equal to about 60%, greater than or equal to about 70%, greater than or equal to about 80%, greater than or equal to about 90%, or greater than or equal to about 95% of the above-referenced pressure ranges. In some instances, the partial pressure of the halogenated compound in the headspace may be less than about 100%, less than or equal to about 99%, less than or equal to about 95%, less than or equal to about 90%, less than or equal to about 85%, less than or equal to about 80%, less than or equal to about 70%, less than or equal to about 60%, less than or equal to about 50%, less than or equal to about 40%, less than or equal to about 30%, or less than or equal to about 20% of the above-referenced pressure ranges. All combination of the above-referenced ranges are possible (e.g., greater than or equal to about 10% and less than about 100%).

In some embodiments, one or more chemical reactions (e.g., electrochemical reactions) may occur in an electrolyte. In general, any suitable non-aqueous electrolyte that is non-reactive with the halogenated compound and has a relatively broad electrochemical stability window (e.g., between about −2 V and about +3.5 V vs SHE) may be used. In some embodiments, the electrolyte is a non-aqueous solvent. For instance, the electrolyte may be an organic solvent. In certain embodiments, the electrolyte is in the solid, liquid, gas, or gel state. In some cases, the electrolyte is a fluid (e.g., liquid). Suitable non-aqueous fluids include, but are not limited to, tetraethylene glycol dimethyl ether (TEGDME) and dimethyl sulfoxide (DMSO). As used herein, the term "electrochemical stability window" has its ordinary meaning in the art. In some embodiments, the electrochemical stability window may be the difference in voltage of the potential limits within which no appreciable oxidation and reduction other than the desired redox reactions occur at positively and negatively polarized electrodes, respectively.

In some embodiments, the halogenated compound has a relatively high solubility in the electrolyte. For instance, halogenated compound may have a solubility of greater than or equal to about 1 mM (e.g., greater than or equal to about 2 mM, greater than or equal to about 3 mM, greater than or equal to about 4 mM, greater than or equal to about 5 mM) at 25° C. and 1 atm.

In some embodiments, one or more reaction products produced as a result of one or more electrochemical reactions may have a relatively high solubility in the electrolyte. For instance, one or more reaction products (e.g., metal halide, LiF) may have a solubility of greater than or equal to about 1 mM (e.g., greater than or equal to about 2 mM, greater than or equal to about 5 mM, greater than or equal to about 10 mM, greater than or equal to about 15 mM, greater than or equal to about 20 mM, greater than or equal to about 25 mM, greater than or equal to about 30 mM, greater than or equal to about 40 mM, greater than or equal to about 50 mM) at 25° C. and 1 atm. In certain embodiments, the metal halide has a relatively high solubility in the electrolyte. For instance, the metal halide may have a solubility of greater than or equal to about 10 mM (e.g., greater than or equal to about 25 mM, greater than or equal to about 50 mM) at 25° C. and 1 atm. In some embodiments, one or more component of the electrolyte may be selected to promote solubility of one or more reactions products.

In some embodiments, an electrolyte as described herein may comprise one or more additives that affects the solubility of the halogenated compound and/or its reaction products (e.g., metal halide) in the electrolyte. For example, the electrolyte may comprise an additive that increases the solubility of the halogenated compound and/or metal halide in the electrolyte. That is, the halogenated compound and/or metal halide may have a higher solubility in the electrolyte in the presence of the additive than in an otherwise equivalent electrolyte that lacks the additive. Non-limiting examples include boron-containing compounds such as tris(pentafluorophenyl)borane, and other organic compounds comprising electron-deficient and anion-receptive groups.

In some embodiments, an electrolyte as described herein may comprise one or more salts to enhance the conductivity of the electrolyte. In general, any suitable salt may be used. In some embodiments, one or more salts may be a metal salt. In some embodiments, the metal in the salt may be selected to be same or have similar properties (e.g., oxidation number) as a metal in the anode. For example, when the anode comprises lithium, non-limiting examples of suitable salts include $LiPF_6$, bis(trifluoromethane)sulfonimide lithium salt (LiTFSI), and $LiClO_4$. As another example, when the anode comprises sodium, non-limiting examples of suitable salts include $NaPF_6$, bis(trifluoromethane)sulfonimide sodium salt (NaTFSI), and $NaClO_4$.

In some embodiments, the anode may comprise a metal. The metal may have a standard reduction potential of less than or equal to about −1.4 V versus the standard hydrogen electrode (SHE). For instance, the metal and/or the anode may have a standard reduction potential versus SHE of less than or equal to about −1.5 V, less than or equal to about −1.6 V, less than or equal to about −1.8 V, less than or equal to about −2.0 V, less than or equal to about −2.2 V, less than or equal to about −2.4 V, or less than or equal to about −2.5 V. For example, the anode may comprise lithium, sodium, calcium, magnesium, aluminum, or combinations thereof. In some embodiments, the anode may comprise an alkali metal (e.g., lithium, sodium, rubidium, cesium, francium) or an alkaline earth metal (e.g., beryllium, magnesium, calcium, strontium, barium, radium). In certain embodiments, the anode may comprise an alkali metal (e.g., lithium, sodium). In some cases, the anode may comprise an alkaline earth metal (e.g., magnesium, calcium).

In some embodiments, the anode may comprise a passivation layer on at least a portion (e.g., substantially all) of one or more surfaces (e.g., two surfaces, all surfaces, surfaces in contact with the electrolyte). The passivation layer may, for example, prevent direct reactions between the halogenated compound and the anode (e.g., metal in the anode). In some embodiments, the passivation layer may comprise organic compounds, oxides, halides, or combination thereof including but not limited to alkali or metal oxides, carbonates, reduction products of the electrolyte, nitrides, fluorides, chlorides, or a physical protective barrier such as a polymer or conductive ceramic. The passivation layer can be formed in a separate chemical step, can be physically placed within the electrochemical cell, or can be formed chemically or electrochemically in situ within the electrochemical cell. In some embodiments, the layer comprises a metal salt. A non-limiting example of a metal salt is $LiClO_4$.

In general, any suitable cathode that is nonreactive toward the halogenated compound in the absence of applied potential or current. Non-limiting examples of suitable materials that the cathode may comprise include carbon (e.g., carbon nanotubes, graphene, carbon fibers), noble metals (e.g., Au, Pt), transition metals, metal oxides, metal fluorides, and combinations thereof.

In general, the cathode may have any suitable surface area. Without being bound by theory, it is believed that efficiency and extent of the electrochemical reaction increases with the surface area of the cathode. In some embodiments, a cathode with a relatively high surface area may be used. For instance, the cathode may have a surface area of greater than or equal to about 10 $m^2/g$, greater than or equal to about 20 $m^2/g$, greater than or equal to about 30 $m^2/g$, greater than or equal to about 40 $m^2/g$, or greater than or equal to about 50 $m^2/g$. In some such embodiments, the cathode may be porous. Surface area may be determined using a BET $N_2$-adsorption method.

In some embodiments, the cathode may have a relatively high void volume. For instance, in some embodiments, the void volume of one or more electrodes (e.g., cathode) may be greater than or equal to about 10%, greater than or equal to about 15%, greater than or equal to about 20%, greater than or equal to about 25%, greater than or equal to about 30%, greater than or equal to about 40%, greater than or equal to about 50%, greater than or equal to about 60%, greater than or equal to about 70%, or greater than or equal to about 80%. In some instances, the void volume may be less than or equal to about 99%, less than or equal to about 95%, less than or equal to about 90%, less than or equal to about 85%, less than or equal to about 80%, less than or equal to about 75%, less than or equal to about 70%, less than or equal to about 60%, less than or equal to about 50%, less than or equal to about 40%, less than or equal to about 30%, or less than or equal to about 20%. All combinations of the above-referenced ranges are possible (e.g., greater than or equal to about 10% and less than or equal to about 99%, greater than or equal to about 40% and less than or equal to about 99%, greater than or equal to about 50% and less than or equal to about 90%). As used herein, void volume has its ordinary meaning in the art.

In some embodiments, a system described herein may have a relatively high discharge capacity. For instance, in some embodiments in which the cathode is or comprise carbon, the discharge capacity may be greater than or equal to about 500 mAh/g, greater than or equal to about 750 mAh/g, greater than or equal to about 1,000 mAh/g, greater than or equal to about 1,250 mAh/g, greater than or equal to about 1,500 mAh/g, greater than or equal to about 1,750 mAh/g, greater than or equal to about 2,000 mAh/g, greater than or equal to about 2,250 mAh/g, greater than or equal to about 2,500 mAh/g, or greater than or equal to about 2,750 mAh/g of carbon and/or less than or equal to about 3,000 mAh/g of carbon.

In some embodiments, a system described herein may have a relatively high energy density. For instance, in some embodiments, the system may have an energy density of greater than or equal to about 100 Wh/kg, greater than or equal to about 250 Wh/kg, greater than or equal to about 500 Wh/kg, greater than or equal to about 750 Wh/kg, greater than or equal to about 1,000 Wh/kg, greater than or equal to about 1,500 Wh/kg, greater than or equal to about 2,000 Wh/kg, greater than or equal to about 2,500 Wh/kg, greater than or equal to about 3,000 Wh/kg, greater than or equal to about 3,500 Wh/kg, greater than or equal to about 4,000 Wh/kg, or greater than or equal to about 4,500 Wh/kg and/or less than or equal to about 5,000 Wh/kg. In kg in the measurement of energy density may include the anode, cathode, and weight of the reactant halogenated molecule consumed.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched, and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "aliphatic" is used to indicate those aliphatic groups (cyclic, acyclic, substituted, unsubstituted, branched, or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The terms "halide" and "halogen" as used herein refer to an atom selected from the group consisting of fluorine, chlorine, bromine, and iodine.

As used herein, "halogenated aliphatic" is a substituted aliphatic group as defined herein wherein one or more of the hydrogen atoms are independently replaced by a halogen, e.g., fluoride, bromide, chloride, or iodide. As used herein, "halogenated alkyl" is a substituted alkyl group as defined herein wherein one or more of the hydrogen atoms are independently replaced by a halogen, e.g., fluoride, bromide, chloride, or iodide. "Perhalogenated alkyl" is a subset of halogenated alkyl, and refers to an alkyl group wherein all of the hydrogen atoms are independently replaced by a halogen, e.g., fluoride, bromide, chloride, or iodide. In some embodiments, the halogenated alkyl moiety has 1 to 8 carbon atoms ("$C_{1-8}$ haloalkyl"). In some embodiments, the haloalkyl moiety has 1 to 6 carbon atoms ("$C_{1-6}$ haloalkyl"). In some embodiments, all of the halogenated aliphatic or alkyl halogenated hydrogen atoms are replaced with fluoro to provide a "perfluorinated aliphatic" or a "perfluorinated alkyl" group, respectively. Examples of halogenated alkyl groups include —$CF_3$, —$CF_2CF_3$, and —$CF_2CF_2CF_3$.

It will be appreciated that the above groups and/or compounds, as described herein, may be optionally substituted with any number of substituents or functional moieties. That is, any of the above groups may be optionally substituted. As used herein, the term "substituted" is contemplated to include all permissible substituents of organic compounds, "permissible" being in the context of the chemical rules of valence known to those of ordinary skill in the art. In general, the term "substituted" whether proceeded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. Combinations of substituents and variables envisioned by this invention are preferably those that result in the formation of stable compounds useful for the formation of an imaging agent or an imaging agent precursor. The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, cyano, alkoxyalkyl, perhaloalkyl, arylalkyloxyalkyl, and the like.

U.S. Provisional Patent Application Ser. No. 62/403,352, filed Oct. 3, 2016, and entitled "Electrochemical Reaction and System for Conversion of Sulfur Hexafluoride" and U.S. Provisional Patent Application Ser. No. 62/556,180, filed Sep. 8, 2017, and entitled "Electrochemical Conversion of Halogenated Compounds and Associated Systems" are incorporated herein by reference in their entirety for all purposes The following examples are intended to illustrate certain embodiments of the present invention, but do not exemplify the full scope of the invention.

Example 1

Exploration of new redox chemistries that combine high potentials and capacities is necessary to increase the energy density of today's batteries and meet future portable power demands. Here, a new lithium-gas primary battery based on the reduction of sulfur hexafluoride ($SF_6$) in an unprecedented 8-electron-per-molecule cathode reaction, i.e. $SF_6$(g)+8e$^-$+8Li$^+$→6LiF(s)+Li$_2$S(s), with a theoretical energy density of 3925 Wh/kg. This battery is described the highest theoretical energy density of Li-based batteries currently under development. Although $SF_6$ is classically considered inert at room temperatures, we show that, surprisingly, its reactivity can be unlocked at an electrified interface using only a simple, uncatalyzed carbon electrode and nonaqueous electrolyte. Reduction potentials range from 2.0-2.3 V vs. Li/Li$^+$ in tetraethylene glycol dimethyl ether (TEGDME) or dimethyl sulfoxide (DMSO)-based electrolytes, with capacities up to ~3840 mAh/$g_C$ or ~830 mAh/$g_{total}$, corresponding to a maximum of 1810 Wh/kg$_{total}$ (total=discharged cathode weight) achieved in the current configuration. Using a suite of tools including in situ pressure analysis, XRD, SEM, and $^{19}$F and $^1$H NMR, the stoichiometry of the discharge reaction has been unambiguously validate, and it has been establish that the reaction is safe and well-controlled, as indicated by high Coulombic efficiency and negligible side reactions. This example demonstrates that the evolution of metal-gas batteries to include new cathode reactions is a promising direction in the development of next generation batteries with step-change improvements in energy densities.

Addressing the continued demand for electrochemical energy systems with high energy density will require advances in the chemistries and mechanisms of energy conversion. In recent years, a focus on electric vehicles has placed an emphasis on rechargeable batteries, in which the intercalation-based lithium ion (Li-ion) (250 Wh/kg$_{cell}$) battery remains state-of-the-art. However, many applications require batteries with much higher energy density, as well as features that cannot be met by Li-ion, such as long-term, safe storage in the charged state and rapid startup in situations where charging is difficult or impossible. Examples include military and space applications, backup power supplies, and undersea and remote operations of devices and vehicles. To this end, commercialized primary lithium-based batteries such as Li-thionyl chloride (Li—SOCl$_2$), Li—MnO$_2$, Li—SO$_2$, and Li-carbon monofluoride (Li—CF$_x$) have played an essential role, with packaged energy densities ranging from 200-600 Wh/kg$_{cell}$. However, maturation of these technologies has resulted in a tapering off of energy density gains in recent years. Meanwhile, the next generation of primary batteries offering further improvements has yet to be clearly identified.

Recent years have seen the development of high-energy metal-air/oxygen batteries, with theoretical gravimetric energies ranging up to 3457 Wh/kg for the Li—O$_2$ system. Although considered prospectively as a secondary (rechargeable) battery, major challenges with high charging voltages and poor round-trip efficiencies in Li—O$_2$ systems have lately shifted the focus to alternative metal anodes such as Na (1108 Wh/kg) or K (935 Wh/kg), albeit at the expense of the high energy density that was the initial attraction of the Li—O$_2$ system. Thus, for now, the future of rechargeable metal-O$_2$ batteries remains unclear. However, the great technological advances emerging from these efforts, and strong potential of this system as a primary battery, have shed new light on the critical role that metal-gas systems can play for broader future energy applications. In this example whether further improvements in energy density are possible by considering an alternative, halogen-based gas cathode reaction for air-independent applications was investigated.

Achieving this aim requires identifying reactions that combine high theoretical voltages and capacities. To date, although a 4-electron transfer is theoretically possible in metal-gas systems based on O$_2$, only 1-electron (for Na—O$_2$ and K—O$_2$) or 2-electron (Li—O$_2$) reactions are commonly observed in practice, with the maximum theoretical capacity of all the metal-gas systems corresponding to 1168 mAh/g (for Li$_2$O$_2$). Interestingly, halogenated molecules with highly oxidized central atoms, e.g. sulfur or carbon, represent an alternative molecular family with the possibility to compete with or exceed O2-based reactions: electron transfer can be accommodated by ligand abstraction and reaction with alkali metal cations, forming nLiX (n=number of ligands and X=F or Cl); the capacity and potential can thus be tailored by tuning the number and type of ligands. One major criterion is to find systems in which the added weight of more complex molecules is well-compensated by large numbers of electrons transferred (for high capacity) and potentials competitive with O2-based systems. In this example, this concept was explored by studying the electrochemical reduction of the most highly perfluorinated gas, SF$_6$, as a model system for an alternative, halogen gas cathode reaction. SF$_6$ contains sulfur in its highest oxidation state (S$^{6+}$) and therefore offers the possibility of an 8-electron reduction of a single molecule, via the following reaction during discharge:

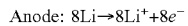

Anode: $8Li \rightarrow 8Li^+ + 8e^-$

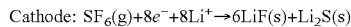

Cathode: $SF_6(g) + 8e^- + 8Li^+ \rightarrow 6LiF(s) + Li_2S(s)$ yielding the overall cell reaction $SF_6(g) + 8Li \rightarrow 6LiF(s) + Li_2S(s)$ ($\Delta G°_r = -2581$ kJ/mol, $E° = 3.69$ V vs. Li/Li$^+$). The combination of high potential and capacity (1063 mAh/g) offers an exceptionally large theoretical gravimetric energy of 3925 Wh/kg. However, SF$_6$ is a classically inert gas, and the reaction between Li and SF$_6$ has heretofore only been known as a chemical reaction at temperature in excess of 800° C. Although the electrochemical reaction of SF$_6$ with Mg has been conceptually proposed by Burke and Carreiro in an earlier study, electrochemical reduction of SF$_6$ as an alkali battery cathode reaction has not yet been conclusively demonstrated in practice. This example explores the hypothesis that reactivity of SF$_6$ might be unlocked under reducing conditions in the presence of Li$^+$ ions, aided in part by the large thermodynamic driving force to form LiF.

Electrochemical cells were constructed using a Li anode, a porous Vulcan carbon cathode, and a nonaqueous electrolyte, 0.3 M LiClO$_4$ in TEGDME or DMSO. To prevent possible parasitic reactivity between Li and SF$_6$, the Li was stabilized prior to cell assembly by soaking it in propylene-carbonate based electrolyte containing 0.1 M LiClO$_4$ salt for several days. Consequently, the stabilized Li electrodes were found to retain their metallic finish throughout the duration of cell measurements, even after long-term discharge for several weeks. Moreover, three-electrode measurements indicated that the open circuit potential of the stabilized Li immersed in SF$_6$—saturated electrolyte remained stable within +/-2 mV over 24 hours. After assembling and purging with SF$_6$ inside an argon-filled glovebox, the cells were pressurized to ~1.5 bar for testing. Solubility measurements indicated an SF$_6$ solubility of ~1-5 mM in both electrolytes in this pressure range, which is noted to be comparable to the solubility of O$_2$ in typical Li—O$_2$ battery electrolytes of approximately 1-10 mM. $^{19}$F NMR measurements confirmed that SF$_6$ was stable and remained intact upon solubilization in the electrolytes. Typical open circuit voltages were ~2.7 V vs. Li/Li$^+$ for TEGDME or ~3.0 V vs. Li/Li$^+$ for DMSO, which are lower than the theoretical potential (i.e., 3.69 V vs. Li/Li$^+$), most likely due to a combination of pinning of the electrode potential by surface oxygen on the carbon electrode as well as sluggish exchange kinetics of SF$_6$.

Figure 2A:
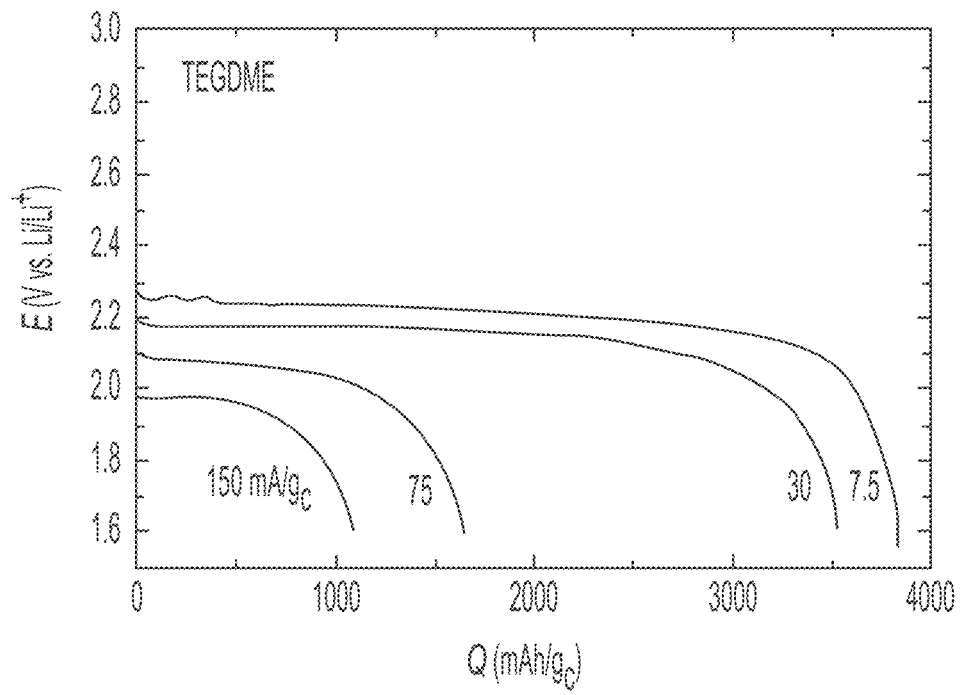
FIG. 2A shows discharge profiles with capacity normalized to the weight of carbon, of Li—$SF_6$ cells at various current densities with a lower voltage cutoff of 1.6 V vs. Li/Li$^+$, according to certain embodiments.
Figure 2B:
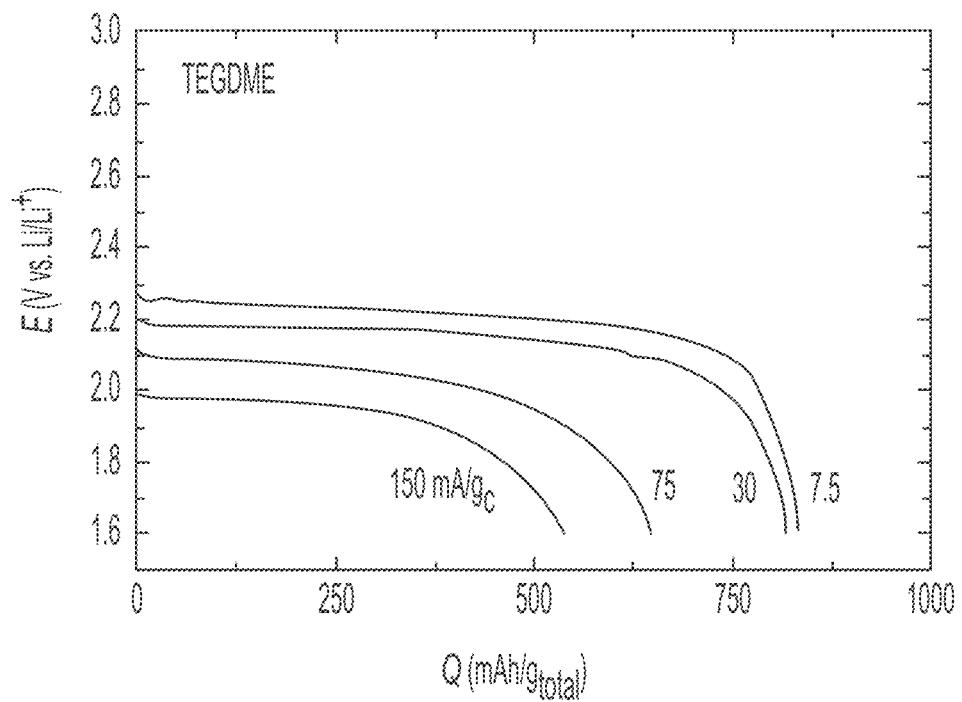
FIG. 2B shows the same discharge profiles of Li—$SF_6$ cells in FIG. 2A but with capacity normalized to weight of the discharged electrode (C+LiF+$Li_2$S) assuming an 8-electron transfer reaction, according to certain embodiments.
Figure 2C:
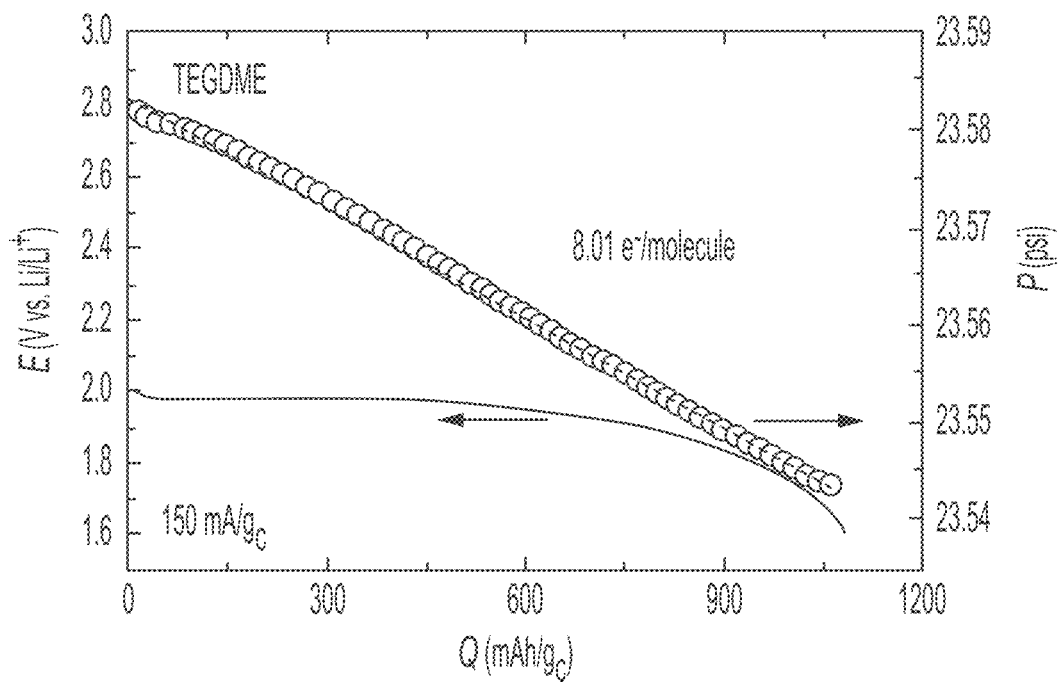
FIG. 2C shows in situ pressure monitoring during discharge at 150 mA/$g_C$, and the corresponding Coulombic ratio calculated using the ideal gas law in the cell headspace, according to certain embodiments.
Figure 2D:
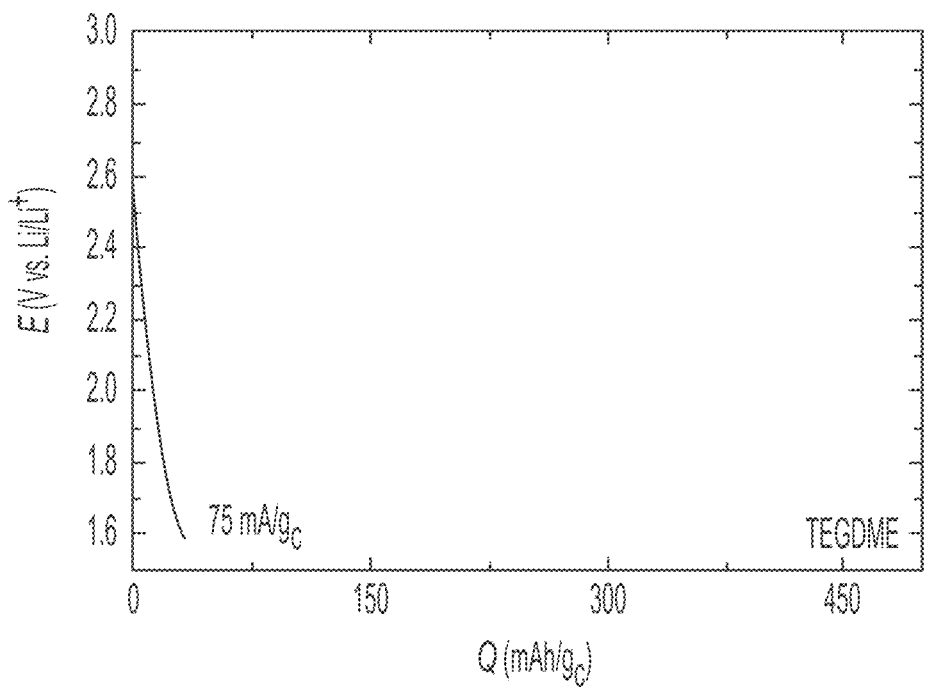
FIG. 2D shows discharge profiles with argon only discharge in TEGDME at 75 mA/$g_c$, according to certain embodiments.
Figure 2E:
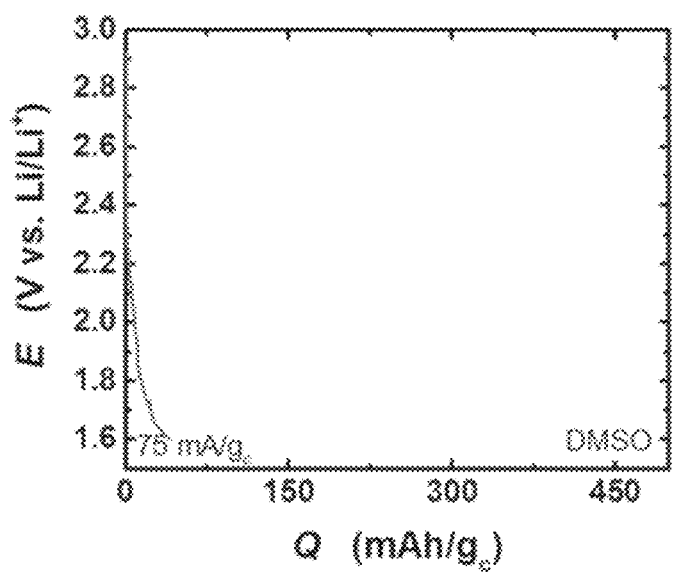
FIG. 2E shows discharge profiles with argon only discharge in DMSO at 75 mA/$g_c$, according to certain embodiments.
Figure 2F:
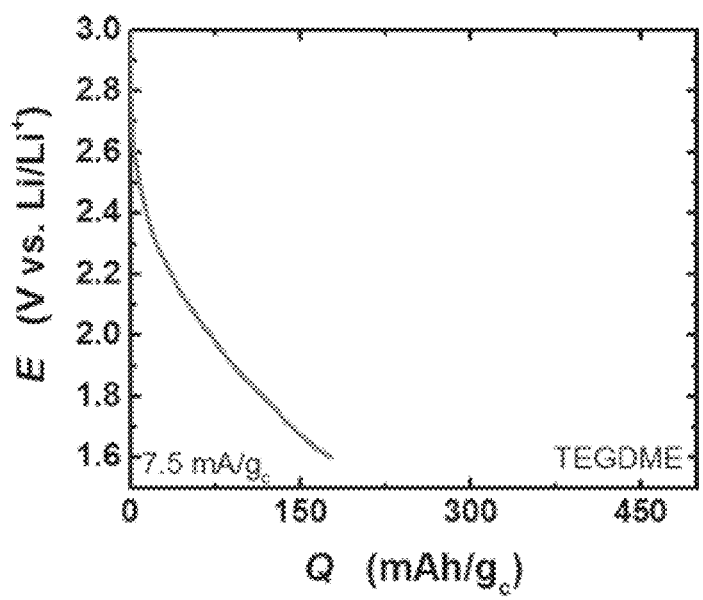
FIG. 2F shows discharge profiles with argon only discharge in TEGDME at 7.5 mA/$g_c$, according to certain embodiments.

Galvanostatic discharge measurements were first conducted in TEGDME with a voltage cutoff of 1.6 V vs. Li/Li$^+$ as shown in FIG. 2A. Cells comparably discharged in Ar were shown to have negligible capacity as shown in FIGS. 2D-2F. FIGS. 2D-2F show Argon-only discharge in a) TEGDME and b) DMSO at 75 mA/gC, and c) TEGDME at 7.5 mA/gC. With SF$_6$ present, discharge at 7.5 mA/g$_C$ resulted in a flat voltage plateau at ~2.2 V vs. Li/Li$^+$, and discharge proceeded to high capacities of 3844 mAh/g$_C$ before the voltage rapidly decreased. For practical consideration, the capacities normalized to the total discharged electrode weight (including carbon and the weight of Li and SF$_6$ consumed in the reaction), rather than the pristine carbon weight only, are presented in FIG. 2B, with the discharged weights calculated assuming an 8-electron reaction. A maximum of 833 mAh/g$_{total}$ was observed at the lowest rate (i.e., 7.5 mA/g$_C$) and high capacity of 818 mAh/g$_{total}$ (i.e., 3533 mAh/g$_C$) was retained up to 30 mA/g$_C$. For reference, these capacities are comparable to the values attainable in Li—O$_2$ batteries using Vulcan carbon electrodes (600-700 mAh/g$_{discharged}$) at full depth of discharge, which indicates a similar total conversion ability and accumulation of the solid phase, although at slightly lower currents. Indeed, as seen in FIGS. 2A-2B, increasing the discharge current resulted in a decrease in the discharge plateau voltage and capacity as typical for metal-gas systems, i.e. 1083 mAh/g$_C$ (537 mAh/g$_{total}$) was obtained at a discharge current of 150 mA/g$_C$, with an average voltage of ~1.9 V vs. Li/Li$^+$.

FIG. 2A discharge profiles, with capacity normalized to the weight of carbon, of Li—SF$_6$ cells at various current densities with a lower voltage cutoff of 1.6 V vs. Li/Li$^+$. FIG. 2B shows the same discharge profiles of Li—SF$_6$ cells in FIG. 2A but with capacity normalized to weight of the discharged electrode (C+LiF+Li$_2$S) assuming an 8-electron transfer reaction. FIG. 2C shows in situ pressure monitoring during discharge at 150 mA/g$_C$, and the corresponding Coulombic ratio calculated using the ideal gas law in the cell headspace.

Figure 3A:
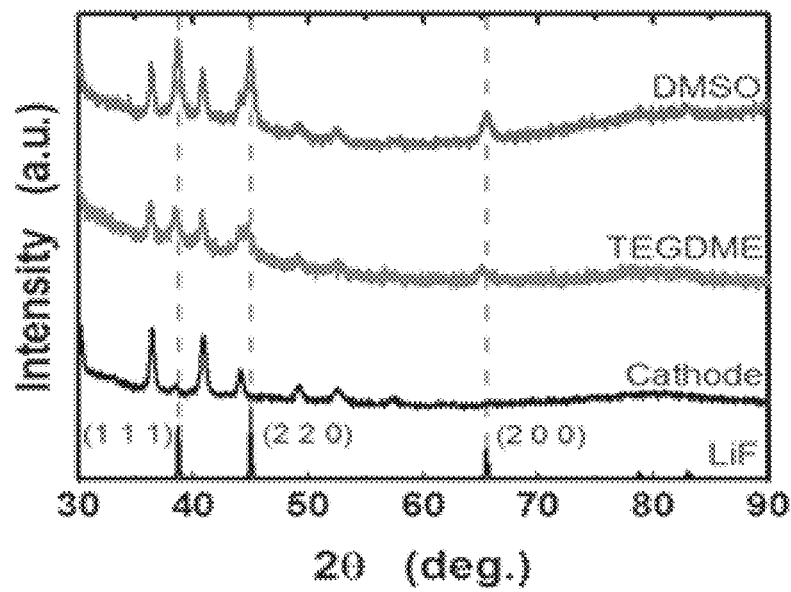
FIG. 3A shows the X-ray diffraction pattern of a pristine and fully discharged cathode in TEGDME and DMSO (75 mA/$g_C$), according to certain embodiments.
Figure 3B:
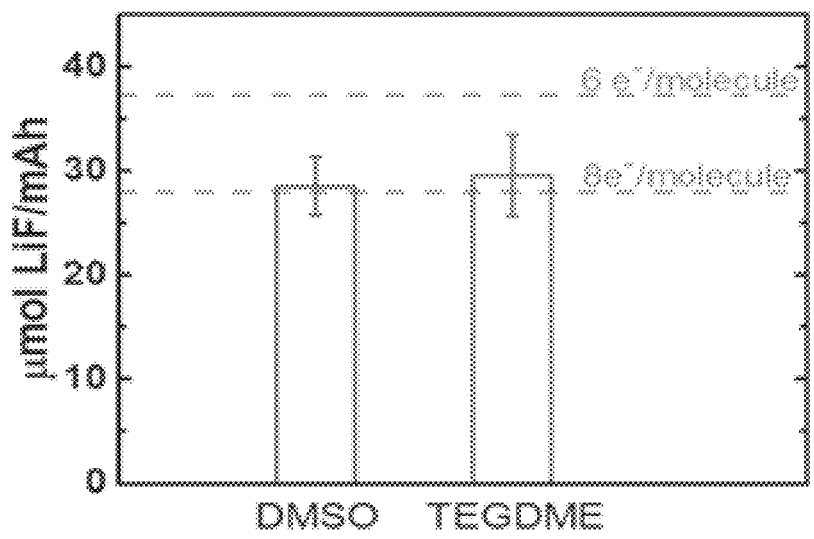
FIG. 3B shows a histogram of μmol LiF/mAh for DMSO and TEGDME, according to certain embodiments.

To examine the reaction taking place, the reaction stoichiometry was determined using a combination of gas-, solid-, and liquid phase analyses. First, to confirm that the SF$_6$ participated in the reduction reaction, the pressure during cell discharge was monitored in situ using a pressure transducer, as shown in FIG. 2C. Throughout reduction at 150 mA/g$_C$, a linear pressure decrease was observed, confirming steady consumption of the gas. Comparison with the total amount of charge passed indicated a Coulombic ratio corresponding to 8.01 e$^-$/molecule. As shown in Table 1, all likely competitive reactions forming stable sulfur fluoride compounds, including partial reduction of SF$_6$ to lower sulfur fluorides such as SF$_4$, and dimerization of the 1-electron SF$_6$ reduction product SF$_5$ to S$_2$F$_{10}$, would result in distinct Coulombic ratios; i.e., no competitive reaction yields an 8-electron transfer per molecule of gas consumed, allowing for unambiguous determination of the reaction stoichiometry. As shown in FIG. 3A, X-ray diffraction of discharged cathodes confirmed that LiF was present and showed it to be the only crystalline product (LiF: Space Group: F m-3 m, JCPDS: 00-004-0857). Additionally, $^{19}$F quantification of the formed LiF by D$_2$O extraction of discharged cathodes indicated that, within measurement error, 6/8 of the discharge capacity was fully accounted for by LiF (i.e., 29.55±3.96 µmol LiF/mAh were formed, compared to a theoretical value of 27.98 µmol LiF/mAh, as shown in FIG. 3B. $^1$H NMR analysis of electrolyte extracted from discharged cells indicated that no observable degradation occurred in solution during discharge, which further indicates that the additional 2 e$^-$/molecule not accounted for in LiF formation went towards the reduction of S to Li$_2$S, which is the thermodynamically stable phase in TEGDME at these potentials.

deviation of five data points. The horizontal dashed lines correspond to the theoretical values for LiF formation in 6-electron (37.31 µmol LiF/mAh, forming 6LiF+S) and 8-electron (27.98 µmol LiF/mAh, forming 6LiF+Li$_2$S) reactions.

Figure 4A:
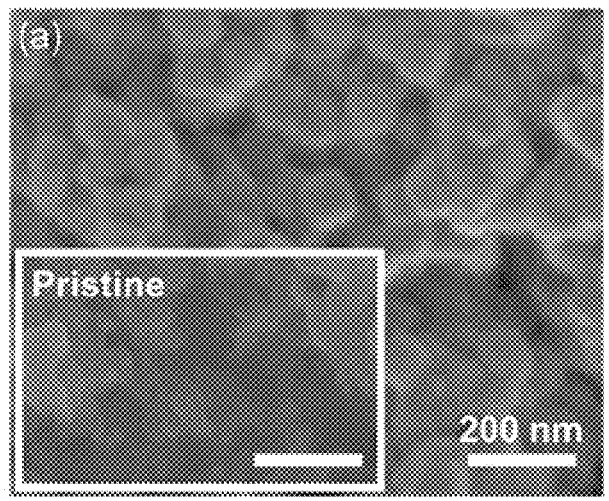
FIG. 4A shows SEM images of cathodes fully discharged to 1.6 V vs. Li/Li' at 75 mA/$g_C$ in TEGDME with a pristine cathode shown in the inset, according to certain embodiments.
Figure 4B:
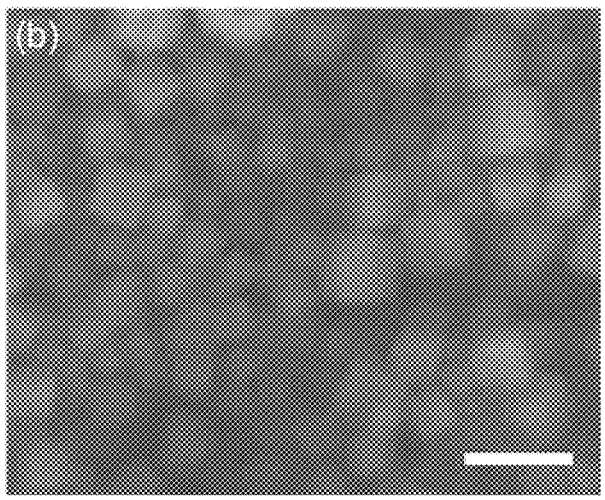
FIG. 4B shows SEM images of cathodes fully discharged to 1.6 V vs. Li/Li$^+$ at 75 mA/$g_C$ in DMSO, according to certain embodiments.

SEM images of discharged cathodes are shown in FIG. 4 and confirmed the formation of solid products as a result of the reduction reaction. In TEGDME as shown in FIG. 4A, a noticeable film was observable on the post-discharge carbon particles, making the particles appear roughly cube-shaped, in agreement with the cubic crystal structure of LiF. To verify the composition of the cubes as well as other discharge phases that were not detectable by XRD, energy dispersive X-ray spectroscopy (EDS) was performed on gas diffusion layer (GDL) electrodes that did not contain any binder. Both sulfur (presumably Li$_2$S) and fluorine were found to be homogeneously distributed in the discharged cathode, at an approximate ratio of 1:5. The approximate S:F atomic ratio observed from EDS agrees well with the expected ratio of 1:6 and indicates that the reduced sulfur phases were largely accounted for in the discharged cathode, as expected owing to the low solubility of Li$_2$S in nonaqueous electrolytes.

FIG. 4 shows SEM images of cathodes fully discharged to 1.6 V vs. Li/Li' at 75 mA/g$_C$ in (4A) TEGDME (1641 mAh/g$_C$) and (4B) DMSO (2466 mAh/g$_C$). A pristine cathode is shown in the inset of (FIG. 4A) for comparison. The scale bar in all panels is 200 nm.

Figure 5A:
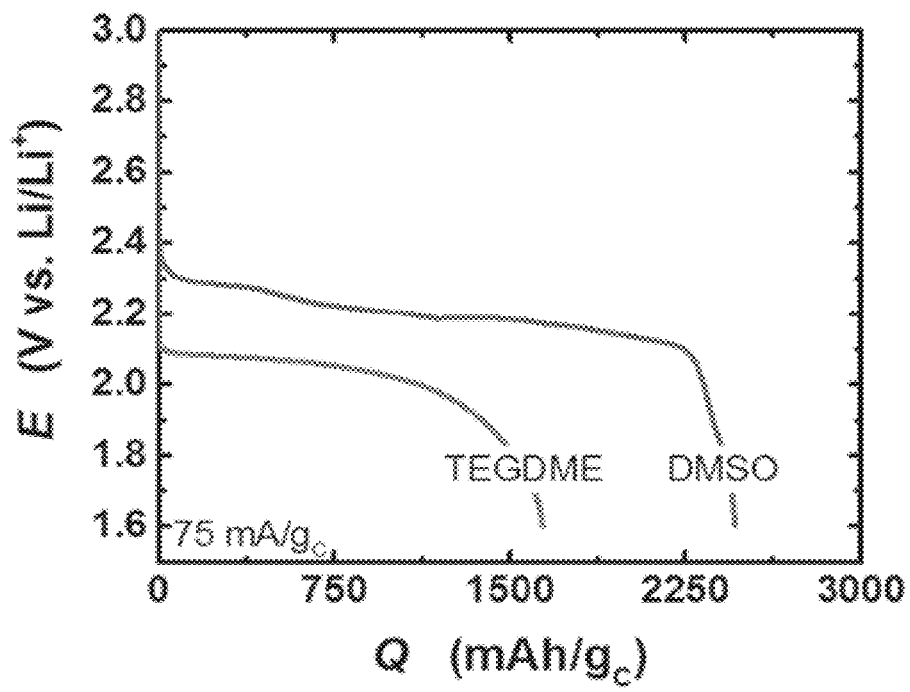
FIG. 5A shows discharge comparison of Li—$SF_6$ cells in TEGDME and DMSO at 75 mA/$g_C$, according to certain embodiments.

To investigate whether the SF$_6$ reduction reaction was transferrable to other electrolyte systems, discharge in DMSO with the same electrolyte salt (0.3 M LiClO$_4$) was also investigated. As shown in FIG. 5A, qualitatively similar discharge profiles were observed under galvanostatic conditions. However, the discharge voltage was significantly higher in DMSO (~2.3 V vs. Li/Li$^+$) compared to TEGDME (2.1 V vs. Li/Li$^+$) as measured at 75 mA/g$_C$, and the capacity was also higher (2466 mAh/g$_C$ compared to 1641 mAh/g$_C$, respectively, at 75 mA/g$_C$), in spite of the fact that the

TABLE 1

Reactions of SF$_6$ with Li

| Reaction | $\Delta G°_T$ (kJ/mol) | # e$^-$/ molecule SF$_6$ | E° (V vs. Li/Li$^+$) | Pressure change during discharge? (Coulombic ratio measured) |
|---|---|---|---|---|
| SF$_6$(g) + 8Li(s) → Li$_2$S(s) + 6LiF(s) | −2851 | 8 | 3.69 | yes (8 e$^-$/moleculeSF$_6$) |
| SF$_6$(g) + 6Li(s) → S(s) + 6LiF(s) | −2417 | 6 | 4.18 | yes (6 e$^-$/molecule SF$_6$) |
| SF$_6$(g) + 2Li(s) → SF$_4$(g) + 2LiF(s) | −783 | 2 | 4.06 | no* |
| SF$_6$(g) + Li (s) → SF$_5$(g) + LiF(s) | −311 | 1 | 3.22 | yes (2 e$^-$/molecule SF$_6$)* |
| 2SF$_5$(g) → S$_2$F$_{10}$(g) | −184 | — | — | |
| 2SF$_6$(g) + 2Li(s) → S$_2$F$_{10}$(g) + 2LiF(s) | −806 | 1 | 4.18 | yes (2 e$^-$/molecule SF$_6$)* |

*Reactions generating 1 mol of gas (e.g. SF$_4$) per 1 mol of SF$_6$ consumed will yield very large Coulombic ratios (→ ∞) owing to negligible gas consumption, whereas reactions generating S$_2$F$_{10}$ generate 1 mol of gas per 2 mol of SF$_6$ consumed.

Table 1 shows full and partial reduction reactions of SF$_6$ by Li, standard Gibbs energy of reaction ($\Delta G_r°$), corresponding number of electrons transferred for an electrochemical reaction, standard thermodynamic potential (E°), and corresponding predicted Coulombic ratios obtained from pressure discharge measurements.

FIG. 3A shows the XRD pattern of a pristine and fully discharged cathode in TEGDME and DMSO (75 mA/g$_C$). The Miller indices of LiF are referenced to JCPDS: 00-004-0857. FIG. 3B shows the results of LiF quantification via $^{19}$F NMR of D$_2$O-extracted, discharged cathodes (75 mA/g$_C$ to full capacity at 1.6 V vs. Li/Li$^+$) using trifluoroethyl alcohol as the internal standard. Error bars represent the standard solubility of SF$_6$ was comparable or slightly lower in DMSO electrolyte. XRD and $^{19}$F NMR quantification similarly revealed the formation of crystalline LiF at a quantity consistent with 6/8 of the total discharge capacity, and SEM revealed an even more distinctly cubic shape of LiF with more sharply defined edges. The different morphologies in the two solvents are interesting, and may help to explain the higher capacity observed in DMSO, in which the LiF appears better-crystallized and to grow as discrete particles rather than a coating morphology. This suggests a possibly longer retention of bare carbon surfaces during discharge before passivation occurs from accumulated products, and could be suggestive of a competition between surface and solution-mediated growth processes.

Figure 5B:
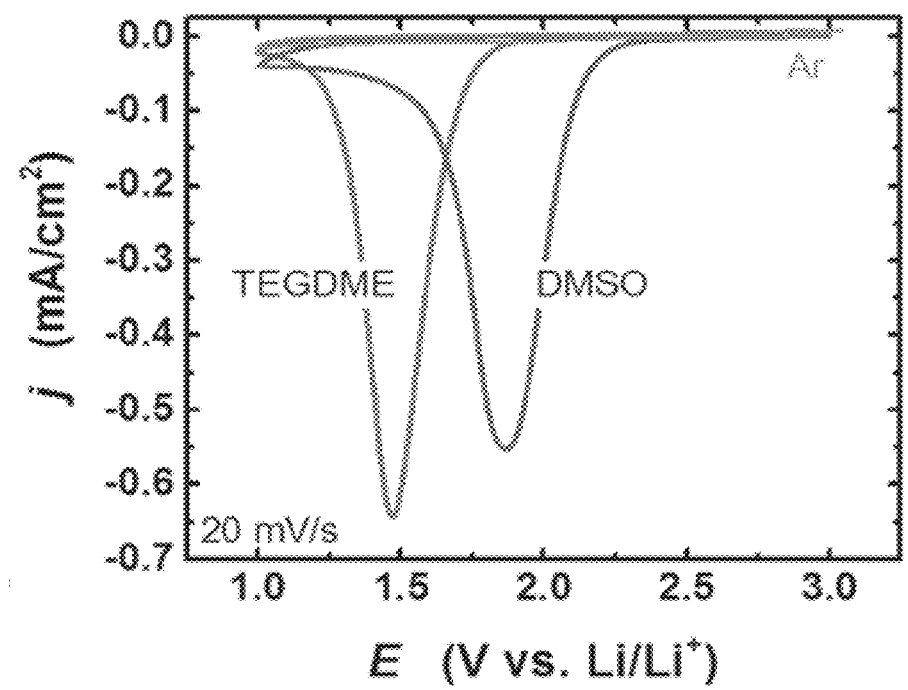
FIG. 5B shows cyclic voltammetry curves of $SF_6$—saturated electrolytes at 20 mV/s in TEGDME and DMSO, with the potential referenced to Li/Li$^+$, according to certain embodiments.
Figure 5C:
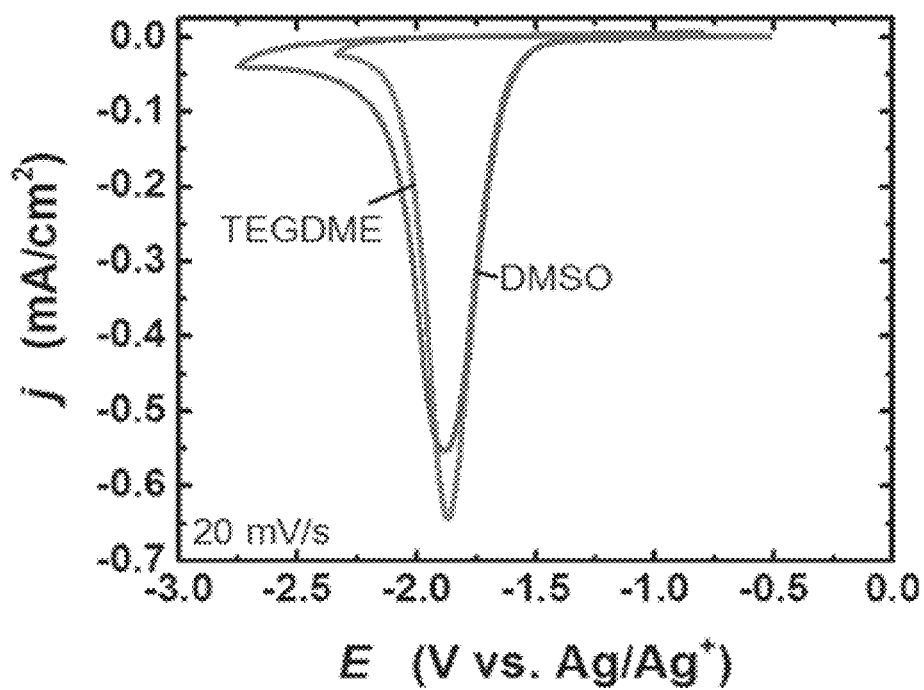
FIG. 5C show cyclic voltammetry curves of $SF_6$—saturated electrolytes at 20 mV/s in TEGDME and DMSO, with the potential referenced to Ag/Ag$^+$, according to certain embodiments.
Figure 5D:
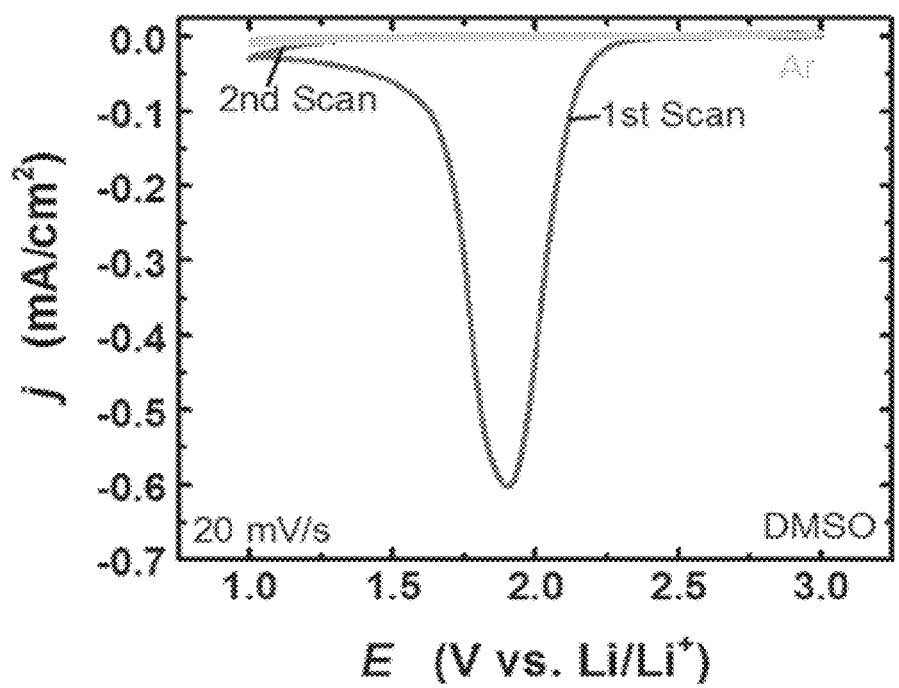
FIG. 5D shows cyclic voltammetry curves of the first and second scan in DMSO at 20 mV/s, according to certain embodiments.

FIG. 5A shows discharge comparison of Li—$SF_6$ cells in TEGDME and DMSO at 75 mA/$g_C$. FIG. 5B-C show (5B) CV curves of $SF_6$—saturated electrolytes at 20 mV/s in TEGDME and DMSO, with the potential referenced to Li/Li$^+$, and (5C) referenced to Ag/Ag$^+$. FIG. 5D shows CV curves of the first and second scan in DMSO at 20 mV/s.

To investigate the origin of the ~150 mV higher discharge potential obtained in DMSO compared to TEGDME in two-electrode Li cells, three-electrode cyclic voltammetry measurements were conducted for the two electrolytes. The setup consisted of a glassy carbon working electrode, a fritted Pt counter electrode and an Ag/Ag$^+$ nonaqueous reference electrode. As shown in FIG. 5B, when the data were plotted on a Li/Li$^+$ scale, a ~400 mV difference in onset potential was observed (at −0.025 mA/cm$^2$), which was more pronounced than the difference in voltage plateau potentials from two-electrode cells, possibly arising from differences in surface area between the nominally planar GC electrode (0.196 cm$^2$ geometric area) and the higher surface-area Vulcan carbon (~100 m$^2$/g) electrode. However, as shown in FIG. 5C, when the data were plotted against the reference electrode (Ag/Ag$^+$) potential (0 $V_{Li}$=−3.4V vs. Ag/Ag$^+$ in TEGDME electrolyte and −3.7 V vs. Ag/Ag$^+$ in DMSO electrolyte), the potential differences vanished. This indicates that the observed voltage differences in two-electrode cells were predominantly dependent on changes in the Li/Li$^+$ redox potential due to differing solvation strength of Li$^+$ ions in TEGDME and DMSO. This further shows that the $SF_6$ cathodic half-reaction on carbon is solvent-independent at least for the two electrolytes studied herein.

As shown in FIG. 5C, in both electrolytes, once the maximum reduction current was attained (at approximately −1.9 V vs. Ag/Ag$^+$), the reduction current rapidly decreased as the electrode was scanned to further reducing potentials. To determine the origin of this behavior, reduction was performed under rotating conditions at 900 rpm. Nearly identical voltammograms were observed, and a limiting current could not be reached, indicating that surface passivation, rather than reactant transport limitations, was the cause of the rapid loss of activity. Indeed, after this first scan, no reduction current could be obtained on the second scan in either electrolyte as shown in FIG. 5D and Swagelok cells that were rested after discharge could also not be further discharged, even with ample $SF_6$ remaining in the cell headspace. This finding indicates that the maximum capacity in this example was limited by the formation of insulating, solid phases (LiF and/or $Li_2S$).

A striking observation of the Li—$SF_6$ electrochemistry in this example was that the reduction potentials in both electrolytes are significantly lower than the thermodynamically-predicted potential of the full eight-electron reduction at 3.69 V vs. Li/Li$^+$. This corresponds to an overpotential greater than 1 V. A drifting Li/Li$^+$ potential at the anode could be ruled out definitively as the cause of this low voltage, due to the measured pre-passivated Li stability in the presence of $SF_6$—purged electrolyte, as discussed above. By all indications, the overpotential arises entirely from the $SF_6$ reduction reaction and is most likely related to the high kinetic barrier of the initial electron transfer to $SF_6$ to form the $SF_6^-$ radical or another similarly reduced intermediate. To help elucidate the rate-determining step of $SF_6$ reduction in this example, CV measurements were conducted with tetrabutylammonium (TBA$^+$) cations instead of Li$^+$. A reduction onset potential of ~2.3 V vs. Li/Li$^+$ (at −0.025 mA/cm$^2$) was observed with TBA$^+$, nearly identical to that with Li$^+$. This indicates an insensitivity of the reduction overpotential to the cation, suggesting that a strong ion pair does not form in either electrolyte. Consequently, the kinetics appear to be determined, at least in part, by the initial electron transfer to $SF_6$—followed by a subsequent chemical association (for TBA$^+$) or reaction (for Li$^+$) with the cation—and thus reflects the electron capture ability of the gas within the electrified interface used in this example.

The Li—$SF_6$ cell demonstrated in this example had an energy density of up to 1810 Wh/$kg_{total}$ at discharge rates of 7.5 mA/$g_C$ (TEGDME), which is comparable to the electrode-level energy densities of state-of-the-art Li—$CF_x$ batteries, while significantly exceeding those of Li—$MnO_2$ and Li—$SOCl_2$ batteries. This maximum energy density, achieved to date with non-optimized electrode composition or architectures, corresponds to 46% of the theoretical value.

Figure 7A:
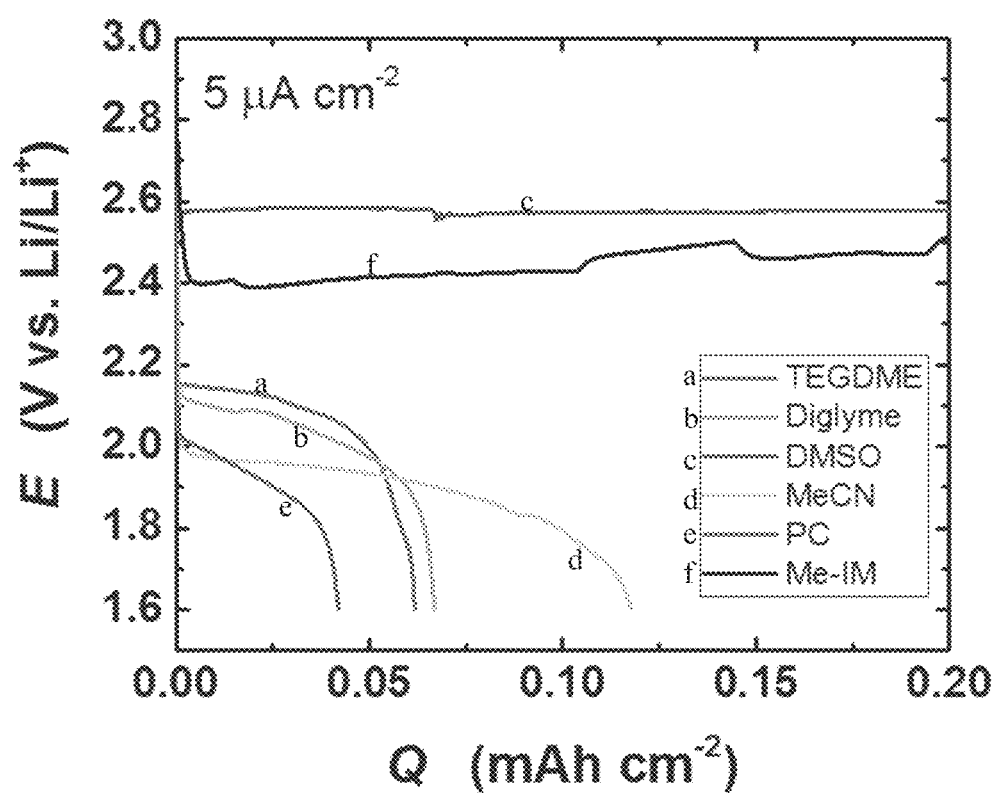
FIG. 7A shows galvanostatic discharge on binder free electrodes in different electrolytes.
Figure 7B:
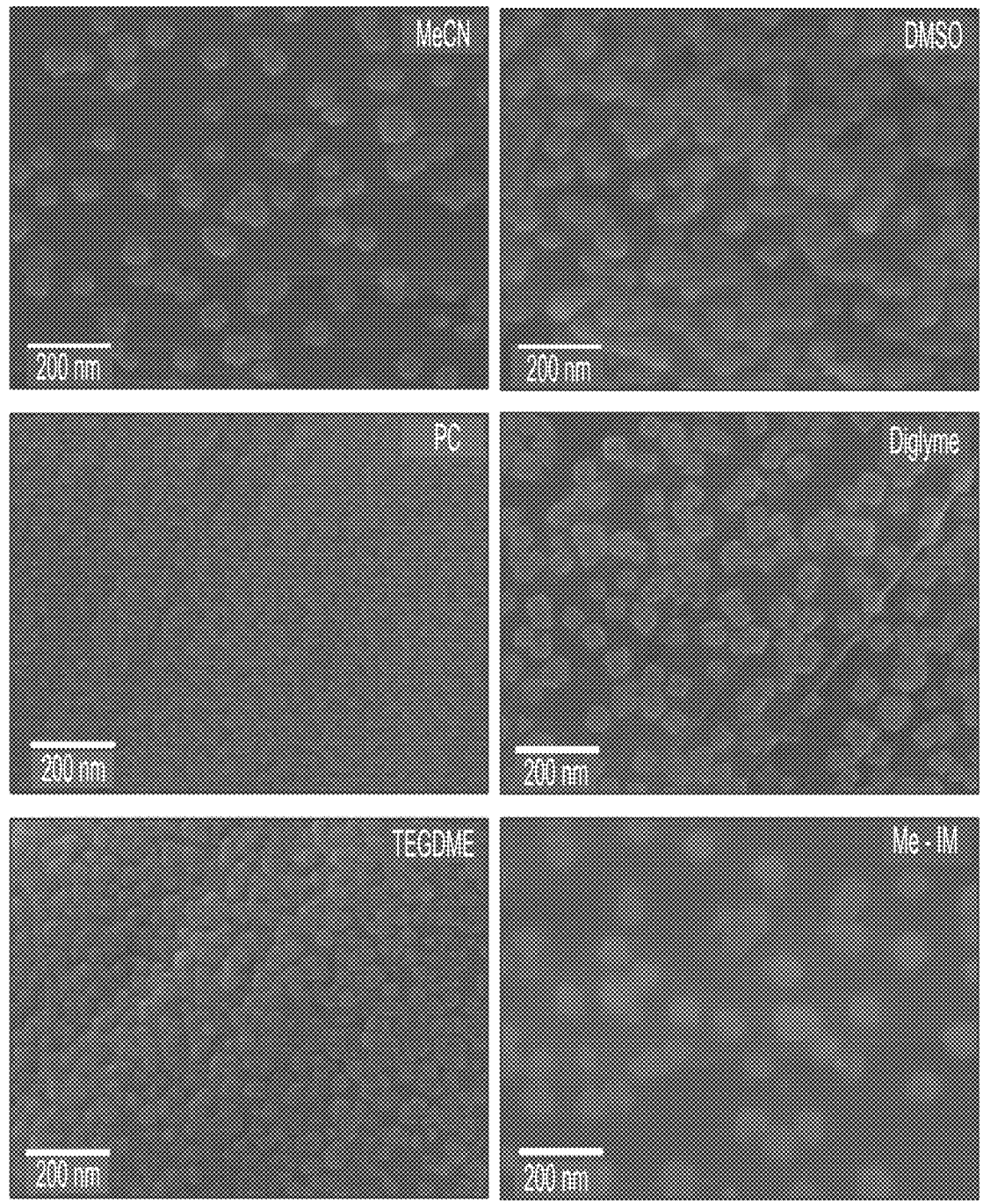
FIG. 7B shows SEM Image of the discharged cathodes used to generate FIG. 7A.

To probe the dependence of $SF_6$ reduction in different aprotic solvents, galvanostatic discharge was performed in a two electrode Swagelok cell configuration. Li—$SF_6$ batteries with limited capacities tend to have solvents which promote rapid surface formation of the cathode surface. This is confirmed when discharged electrodes in different solvents with a capacity cutoff of 0.05 mAh was analyzed with ex-situ SEM to observe the morphological differences. It is evident that some cathodes are completely covered by LiF whereas other cathodes show the precipitation of LiF into solution. This strongly suggests that the capacity differences observed in different Li—$SF_6$ batteries depend on the ability of the solvent to solubilize LiF. FIG. 7A shows galvanostatic discharge on binder free electrodes in different electrolytes and FIG. 7B shows SEM Image of the discharged cathodes used to generate FIG. 7A.

In summary, a Li—gas battery based on the controlled electrochemical reduction of $SF_6$ in a nonaqueous environment, with discharge potentials ranging from 2.0-2.3 V vs. Li/Li$^+$ and high capacities in excess of 800 mAh/$g_{total}$ was developed. The reaction stoichiometry was quantified by in situ pressure monitoring during discharge and $^{19}$F NMR of dissolved post-discharged cathodes, which revealed an 8 e$^-$/molecule reaction in which all of the fluoride ions were incorporated into the solid LiF phase. SEM imaging revealed the LiF deposits to be cube shaped, which reflected their crystalline structure as confirmed by XRD.

Chemicals and Materials. All solid chemicals, electrodes, and cell-making materials were dried prior to use and stored in an argon-filled glovebox (MBRAUN, $H_2O$ <0.3 ppm and $O_2$<15 ppm). Lithium perchlorate ($LiClO_4$, Sigma Aldrich, battery grade, 99.9% metal basis) was dried for 24 hours under active vacuum in a glass oven (Buchi) at 70° C. Dimethyl sulfoxide (DMSO, Sigma Aldrich >99.9%), tetra ethylene glycol dimethyl ether (TEGDME, Sigma Aldrich >99%), propylene carbonate (PC, Sigma Aldrich >99%), and acetonitrile (MeCN, Sigma Aldrich >99%) were dried over fresh molecular sieves (Type 3 Å, Sigma Aldrich) that had been previously dried under active vacuum in a glass oven at 120° C. for at least 24 hours. The water content in the electrolyte was measured using a Karl Fisher titrator (Metler Toledo) and was found to be typically <10 ppm.

Carbon Electrode Fabrication. Cathodes were prepared by coating sonicated inks composed of Vulcan carbon (VC, XC72, Cabot), Li-ion exchanged Nafion (LITHion™ Dispersion, Ion Power, Nafion/carbon wt. ratio of 1:2), and isopropanol onto a microporous separator film (Celgard 480, 25 μm thickness). The cathodes were then air-dried at room temperature and punched to 12 mm diameter, prior to drying in a glass oven under active vacuum at 70° C. for 24 hours. The typical thickness of the carbon layer on the electrodes was 15 μm, and the corresponding carbon loading ranged from 0.32±0.09 mg$_C$ (0.28±0.08 mg$_C$/cm$^2$). The error bar represents four measurements from electrodes used in FIG. 2A-2B.

Li—SF$_6$ Cell Assembly and Testing. Two-electrode Swagelok electrochemical cells were constructed using a 10 mm diameter disk of Li metal as the negative electrode (0.38 mm thickness, Sigma Aldrich), which was pre-stabilized by soaking in 0.1 M LiClO$_4$ in PC for several days before use.[28] The cells were assembled inside the glovebox using either 0.3 M LiClO$_4$ in TEGDME or DMSO as the electrolyte. Following assembly, the cells were purged with SF$_6$ (Airgas, 99.999% purity) within the glovebox for approximately 5 minutes, were pressurized to ~1.5-1.8 bar, and were sealed for subsequent measurement outside the glovebox. The Li—SF$_6$ cells were rested at open circuit voltage (~2.5-3 V vs. Li/Li$^+$) for 15 hours, before being galvanostatically discharged (Biologic VMP3 or MPG2 Workstation) at specified currents to a voltage cutoff of 1.6 V vs. Li/Li$^+$.

In Situ Pressure Monitoring. Briefly, the pressure-coupled measurement was conducted using a pressure transducer (PX309, Omega) fitted to a modified Swagelok design. The cell was discharged inside an incubator at 25±1° C. as described in more detail below.

Rotating Disk Electrode Measurements. Three-electrode electrochemical measurements, conducted within an Ar glovebox, employed a glassy carbon disk (GC, Pine, 0.196 cm$^2$) as the working electrode, a Ag wire immersed in 0.01 M AgNO$_3$ and 0.1 M TBAClO$_4$ in MeCN (housed within a fritted glass tube) as the reference electrode, and Pt wire contained within a fritted glass compartment and filled with the working electrolyte as the counter electrode. The working electrolyte was saturated with SF$_6$ by bubbling prior to the measurement, and cyclic voltammetry was conducted at a scan rate of 20 mV/s. Additional details can be found in the Supporting Information.

Characterization. SEM was conducted on discharged cathodes using a Zeiss Merlin high-resolution SEM operating at an accelerating voltage ranging from 2 kV to 5 kV and beam current of 100 pA. EDX elemental mapping was also performed using the Zeiss Merlin SEM. XRD was obtained on both the pristine and solvent-rinsed discharged electrodes using a PANalytical X'Pert Pro with a copper anode (Cu K$_\alpha$). An air-sensitive sample holder was used to seal the discharged electrode to minimize atmospheric contamination during measurements. All scans for LiF detection were performed from 30°<2θ<90° at a typical scan speed of 0.3°/min. $^{19}$F NMR and $^1$H NMR measurements were performed using a Varian Mercury 300 MHz NMR spectrometer equipped with a 5 mm PFG (pulsed field gradient) quad probe. Electrolytes were purged with SF$_6$ for ten minutes in a closed glass cell and rested for two hours. For sample preparation, 600 µL of the electrolyte along with 120 µL of DMSO-d$_6$ (Sigma Aldrich, used for locking) was introduced into a capped Wilmad NMR tube (528-PP-7) for $^{19}$F NMR analysis. $^1$H NMR was performed on antechamber-dried electrodes washed in D$_2$O (Sigma Aldrich, >99.9%). Quantification of LiF in discharged electrodes was also performed with $^{19}$F NMR by introducing a known internal standard of 2,2,2-trifluoroethanol (TFE, Sigma Aldrich >99.5%).

Figure 6:
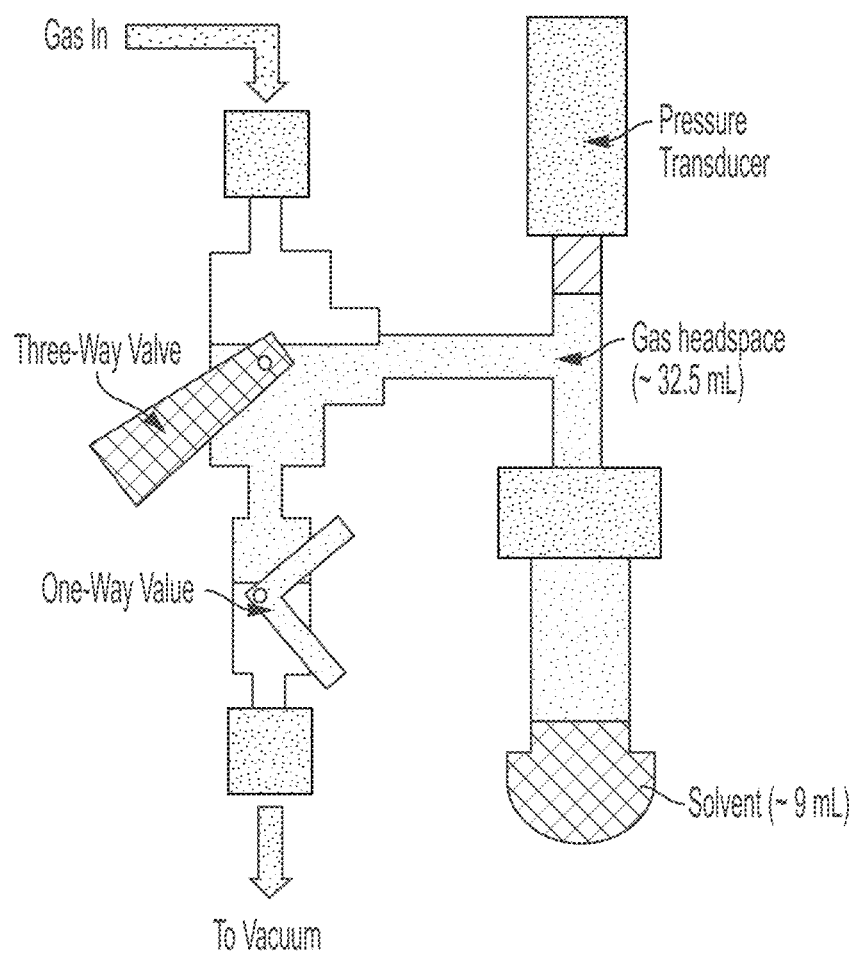
FIG. 6 shows an apparatus for measuring solubility, according to certain embodiments.

Solubility Measurements: SF$_6$ solubilities were measured in nonaqueous electrolytes using a custom apparatus (41.5 mL) coupled to a pressure transducer (PX309, Omega) as shown in FIG. 6. The apparatus was first dried under active vacuum at 50° C. for at least 24 hours, and was subsequently transferred to the glovebox with minimal exposure to the atmosphere. In typical measurements, ~9 mL of molecular sieve-dried electrolyte was poured into the cell chamber, both valves of the apparatus were closed, and the device was transferred back outside with the headspace maintained under argon. Solubility measurements were conducted following a modified procedure from one reported previously (Dunn, B.; Kamath, H.; Tarascon, J. M. Science 2011, 334, 928-935): 1) The pressure measurement cell was exposed to active vacuum until the pressure decreased to ~0.1-0.9 bar (denoted as p$_0$ and recorded for each measurement), after which 2) the cell was rapidly pressurized with SF$_6$ via a three-way valve until the target initial pressure p was reached, corresponding to a net pressure p–p$_0$ of SF$_6$ in the headspace; and 3) the cell was sealed by switching the valve to the 'closed' position. The pressure decay curve was monitored until a steady-state pressure was reached, with typical equilibration times of 10-15 hours.

Upon reaching steady-state, the solubility of the gas was determined by relating the change in headspace pressure to the number of moles of SF$_6$ dissolved in the known electrolyte volume using the ideal gas law, and assuming negligible contributions from residual argon in the cell. Measurements were made for multiple initial pressures.

Pressure-coupled Li—SF$_6$ cell discharge: Pressure-coupled measurements were conducted by incorporating a pressure transducer (PX309, Omega) to a modified version of the Swagelok cell design, similar to the approach reported by Gao, X. P.; Yang, H. X. Energy Environ. Sci. 2010, 3, 174-189 The total volume of the cell headspace was ~11.6 mL, which allowed for direct calculation of the moles of gas, Δn, consumed during discharge:

$$\Delta n = \frac{\Delta P V}{RT}.$$

The molar ratio of electrons transferred/SF$_6$ converted during reduction was then determined from Δn and the discharge capacity, Q$_{discharge}$, as $$\frac{\text{mol e}^-}{\text{mol of SF}_6} = Q_{discharge}[\text{mAh}] \left( \frac{3.6 \left[\frac{C}{\text{mAh}}\right]}{96485 \left[\frac{C}{\text{mol e}^-}\right]} \right) \Delta n^{-1} [\text{mol } SF_6]^{-1}$$

To maintain steady temperature, the cell was discharged inside an incubator held at 25.0±0.1° C. (Memmert IPP 110).

Rotating disk electrode measurements: Three-electrode electrochemical measurements were conducted within an Ar glovebox using a glass electrolysis-type cell (Pine) and a glassy carbon (GC, Pine, 0.196 cm$^2$) working electrode mounted to a Modulated Speed Rotator (Pine). The reference electrode (Pine) consisted of a Ag wire immersed in 0.01 M AgNO$_3$ and 0.1 M TBAClO$_4$ in MeCN, and was housed within a fritted glass tube. The counter electrode was a platinum wire contained within a glass fritted compartment and filled with the new working electrolyte (0.3 M LiClO$_4$ in TEGDME or DMSO) for each measurement. Prior to each set of scans, the GC electrode was polished using de-ionized water (18.2 MΩ cm, Millipore) in the following sequence: 5 µm, 3 µm, 1 µm, and 0.3 µm polishing papers (Thor Labs) until a mirror finish was obtained, followed by sonication in DI water for 5 minutes and drying under active vacuum in a glass oven (Buchi) at 70° C. for at least 12 hours. Finally, electrodes were transferred directly into the glovebox without exposure to the ambient.

To establish the potential of the reference electrode relative to Li/Li$^+$, a piece of Li metal was first placed in the electrolyte solution (without SF$_6$) and its potential was monitored vs. Ag/Ag$^+$ until stabilization (approximately 30 minutes), at which point the potential difference was measured: 0 V$_{Li}$=−3.4 V vs. Ag/Ag$^+$ in 0.3 M LiClO$_4$ in TEGDME, and 0 V$_{Li}$=−3.7 V vs. Ag/Ag$^+$ in 0.3 M LiClO$_4$ in DMSO. The potential measured in DMSO electrolyte is in excellent agreement with what has been previously reported (0 V$_{Li}$=−3.750 V vs. Ag/Ag$^+$), and the potential measured in TEGDME electrolyte is in good qualitative agreement with expected trends based on donor number, where the observed differences in Li/Li$^+$ standard potential can be accounted for by differences in Li$^+$ solvation energy between DMSO (DN=29.8 kcal/mol$^5$) and TEGDME (DN=16.6 kcal/mol$^5$). Introduction of SF$_6$ gas to the electrolyte did not influence the average Li/Li$^+$ potential.

Following determination of the Li/Li$^+$ potential, the working electrode was then immersed in the electrolyte and steady state CVs were obtained under a passive argon headspace by scanning the GC electrode potential from 1-3 V vs. Li at a scan rate of 20 mV/s. Next, SF$_6$ was bubbled into the electrolyte for ten minutes, after which the ports of the glass cell were sealed for at least two hours to allow saturation of the electrolyte by SF$_6$. Following this rest step, comparison of CVs obtained under blanketing (no additional SF$_6$) conditions and with actively flowing SF$_6$ were comparable and therefore, subsequent CVs were obtained without additional blanketing of the SF$_6$ gas. In a typical CV measurement, approximately $4.0 \times 10^{-4}$ mAh of charge was passed on reduction, which corresponds to approximately $2.0 \times 10^{-6}$ mmol of consumed SF$_6$ assuming a complete 8-electron transfer reduction. Based on the difference between the consumed and assumed available dissolved SF$_6$ species in the electrolyte (~1 mM concentration and ~20 mL electrolyte) at atmospheric pressure, >99.99% of the SF$_6$ remained within the electrolyte after the first scan, respectively.

Quantification of LiF yield. The amount of LiF present in galvanostatically discharged cathodes was determined using the following procedure: Discharged cathodes were dried, without rinsing, inside the antechamber of the glovebox for approximately one hour or until all of the solvent evaporated, and were then soaked in known amounts of D$_2$O to dissolve the solid LiF. A portion of this solution was then extracted and transferred to an NMR tube, into which a known amount (5.5-13.7 mM) of 2,2,2-trifluoroethanol (TFE, Sigma Aldrich >99.5%) was added as an internal standard. The validity of TFE as an internal standard was confirmed separately by measuring the relative integrated areas I$_{TFE}$/I$_{LiF}$, and comparing to the theoretical ratios by varying different concentrations of LiF (0~35 mM) and dissolving 13.7 mM of TFE. The LiF peak was observed at −122 ppm with the D$_2$O cathode wash, which is in good agreement with previous observations.

Calculation of Weight of Positive Electrode:
For SF$_6$:
Q$_{Measured}$: total discharge cell capacity measured
q$_{SF6}$: mol of SF$_6$ per mAh based on 8e$^-$/SF$_6$ reaction
n$_{LiF}$: mol of LiF formed
n$_{Li2S}$: mol of Li$_2$S formed
MW$_{LiF}$: molar mass of LiF
MW$_{Li2S}$: molar mass of Li$_2$S
total weight: total discharged cathode weight $$8Li + SF_6 \rightarrow Li_2S + 6LiF$$

$$q_{SF6} = \frac{\left(3.6 \frac{C}{mAh}\right)}{\left(8 \frac{mol\,e^-}{mol\,SF_6}\right) \times \left(96485 \frac{C}{mol\,e^-}\right)} = 4.664 \times 10^{-6} [mol\,SF_6/mAh]$$

$$n_{LiF} = 6 \times q_{SF6} \times Q_{Measured} [mol\,LiF]$$

$$n_{Li2S} = q_{SF6} \times Q_{Measured} [mol\,Li_2S]$$

$$MW_{LiF} = 25.939 [g/mol]$$

$$MW_{Li2S} = 45.95 [g/mol]$$

total weight = $m_C + (n_{LiF} \times MW_{LiF}) + (n_{Li2S} \times MW_{Li2S}) [g]$ Example 2

Figure 8A:
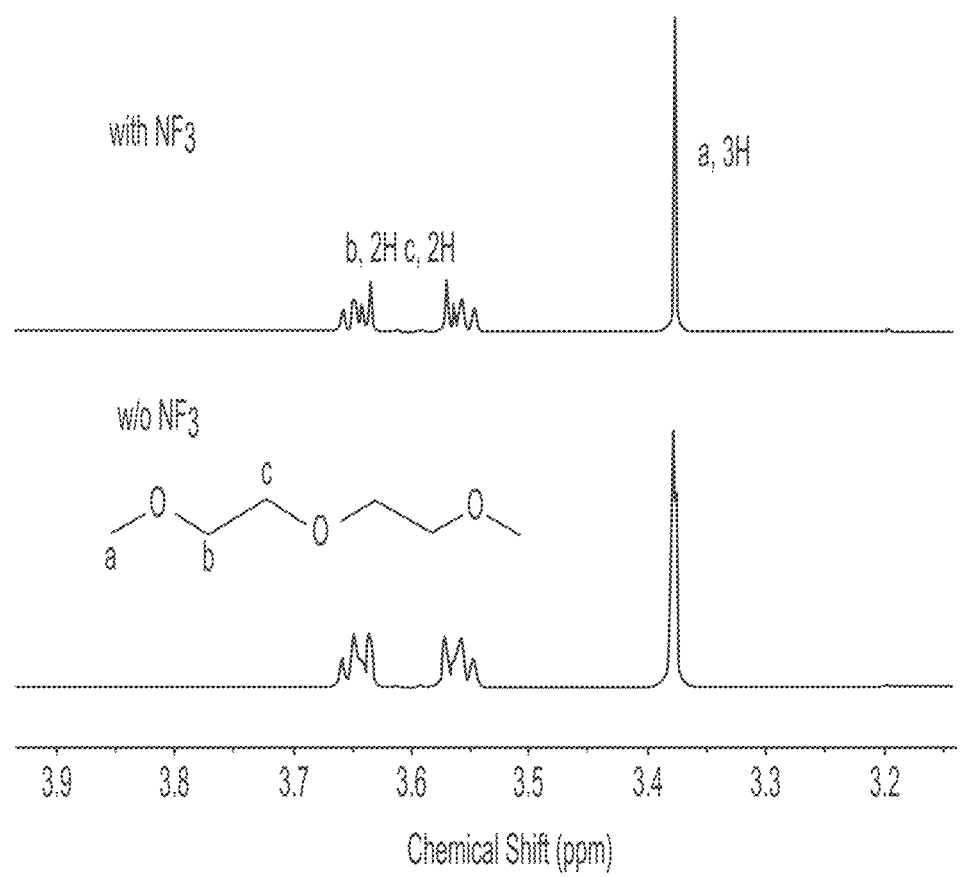
FIG. 8A shows $^1$H-NMR spectra of 70 mM LiClO4/Diglyme with and without $NF_3$-bubbling, according to one set of embodiments.
Figure 8B:
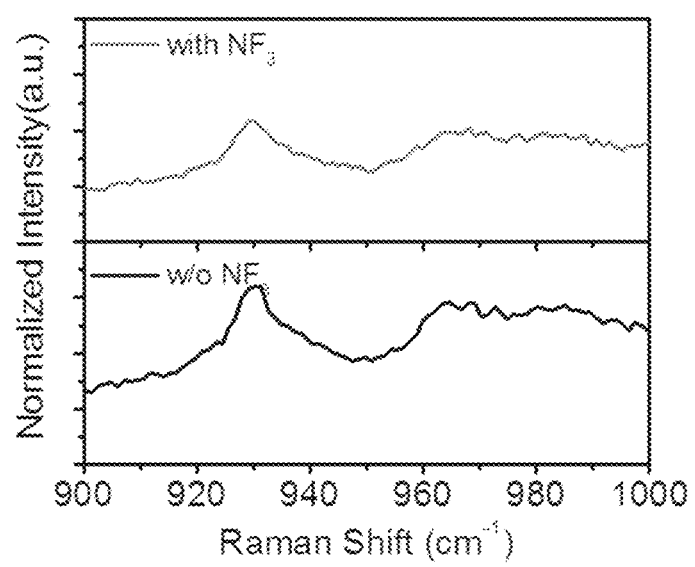
FIG. 8B shows Raman spectra of 70 mM LiClO4/Diglyme with and without $NF_3$-bubbling, according to certain embodiments.

This example describes the chemical stability of electrolyte solutions towards NF$_3$. Electrolyte is an important component in an electrochemical cell. The chemical stability of the electrolyte towards nitrogen trifluoride (NF$_3$) contributes to the successful function of a Li—NF$_3$ electrochemical cell. The electrolyte consisted of an organic solvent and a Lit-containing salt. FIGS. 8A and AB show $^1$H NMR and Raman spectra of the electrolyte, 70 mM lithium perchlorate (LiClO$_4$) in diethylene glycol dimethyl ether (diglyme), before and after exposure to NF$_3$ at room temperature for overnight. The NMR spectrum detects the solvent diglyme while Raman spectrum shows the salt. Both electrolyte components, i.e. solvent and salt, did not degrade upon exposure to NF$_3$ as evidenced by the spectra from the electrolyte before and after reaction are identical. This confirmed that the electrolyte could not be decomposed by nitrogen trifluoride. Other electrolytes such as LiClO$_4$ in propylene carbonate (PC), dimethyl sulfoxide (DMSO), tertraethylene glycol dimethyl ether (TEGDME), and acetonitrile (MeCN) were also examined in the same way and all showed good chemical stability towards NF$_3$.

Example 3

Figure 9A:
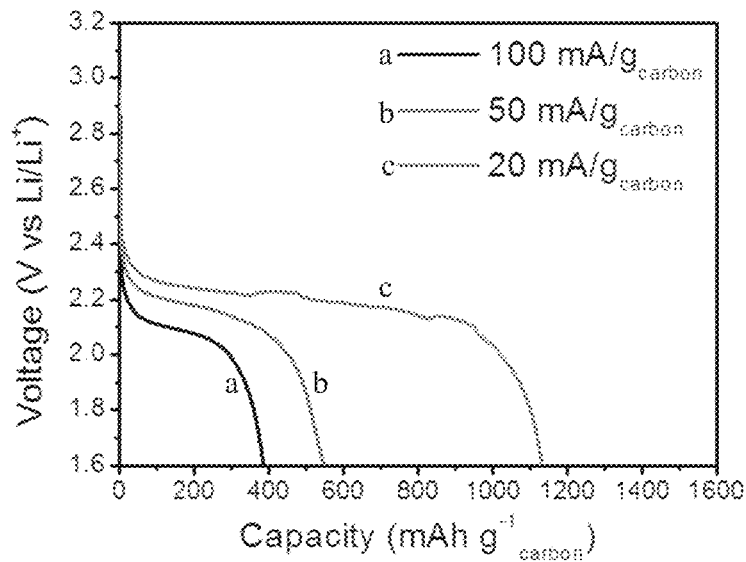
FIG. 9A shows a graph of voltage versus capacity for different gravimetric currents, according to one set of embodiments.
Figure 9B:
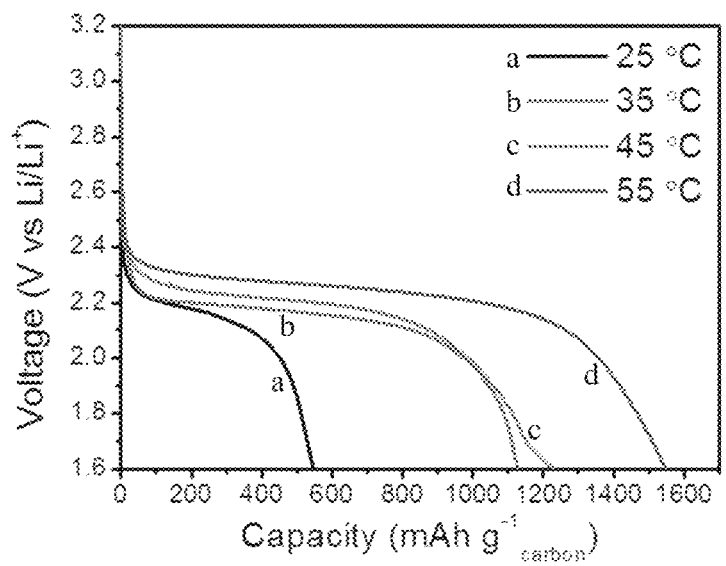
FIG. 9B shows a graph of voltage versus capacity for different temperatures, according to certain embodiments.
Figure 9C:
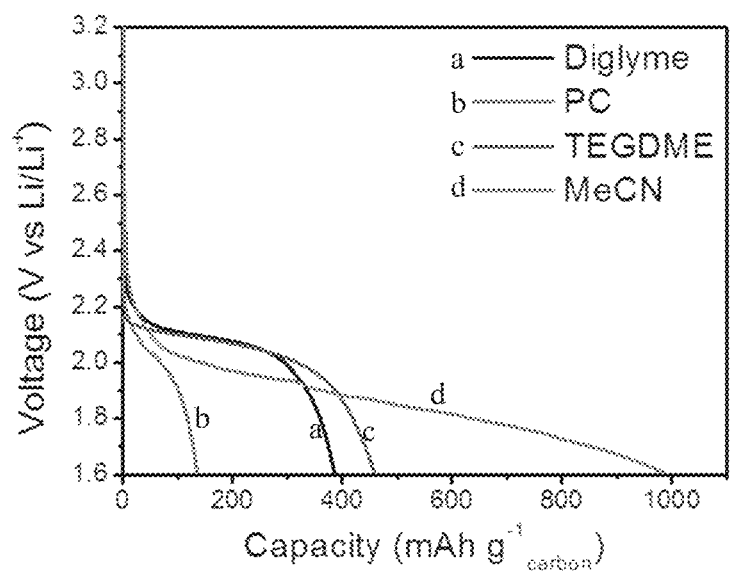
FIG. 9C shows a graph of voltage versus capacity for different solvents, according to one set of embodiments.
Figure 9D:
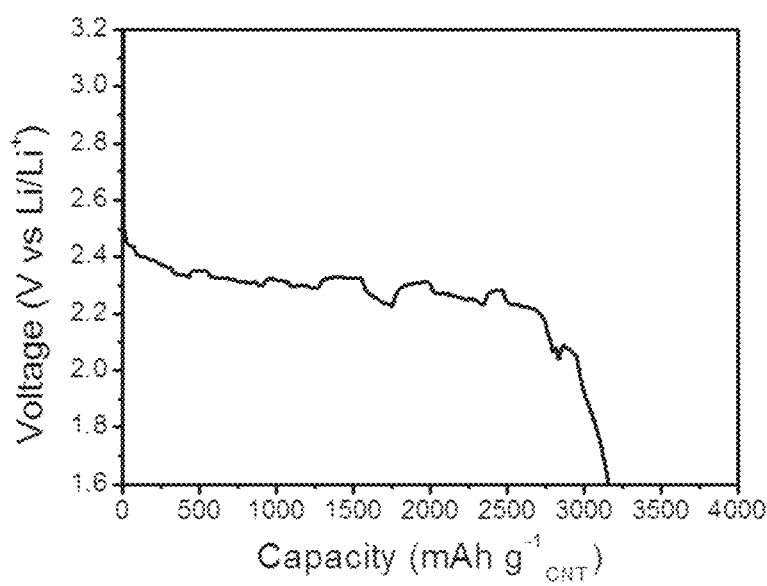
FIG. 9D shows a graph of voltage versus capacity for a cathode containing carbon nanotubes, according to certain embodiments.

This example describes the electrochemical reduction of NF$_3$ in a non-aqueous, Li—NF$_3$ cell. The Li—NF$_3$ electrochemical cell contained a Li metal, which was stabilized in 0.1 M LiClO$_4$/PC for at least 3 days prior to use, as the anode, 150 µL electrolyte solution-soaked Whatman filter paper as the separator, and carbon-coated Celgard film as the cathode. Cell components were assembled inside a glove box (H$_2$O level <15 ppm, and 02 level <1 ppm) and the cell headspace was purged with NF$_3$ (purity: 99.99%) for 2 minutes. Sealed cells were galvanostatically discharged under different conditions including different gravimetric currents, temperatures, solvents, and cathode materials. Galvanostatic discharge profiles of these Li—NF$_3$ electrochemical cells are shown in FIGS. 9A-9D. The figures demonstrate that: (1) lower gravimetric current leads to larger gravimetric discharge capacity and higher discharge voltage plateau as shown in FIG. 9A. Discharge capacity as high as ~1100 mAh/g$_{carbon}$ can be obtained at the gravimetric current of 20 mA/g$_{carbon}$. (2) Increasing the temperature from room temperature up to 55° C. can also improve the gravimetric discharge capacity and increase the discharge voltage plateau as shown in FIG. 9B. (3) The Li—NF$_3$ cell can achieve good capacity with various solvents and different carbon materials, such as carbon nanotubes, demonstrating the versatility of this system as shown in FIGS. 9C and 9D. FIGS. 9A-9B demonstrates different gravimetric currents and different temperatures with the same gravimetric current of 50 mA/gcarbon, respectively. The cathode is Vulcan carbon and the electrolyte is 70 mM LiClO$_4$ in diglyme. FIG. 9C demonstrates different solvents for the electrolyte. The electrolyte concentration is 0.1 M LiClO$_4$ except 70 mM for diglyme. The gravimetric current is 100 mA/gcarbon. FIG. 9D demonstrates a free standing carbon nanotube (CNT) film as the cathode. The electrolyte is 70 mM LiClO$_4$ in diglyme and the gravimetric current is 20 mA/gCNT.

Example 4

Figure 10A:
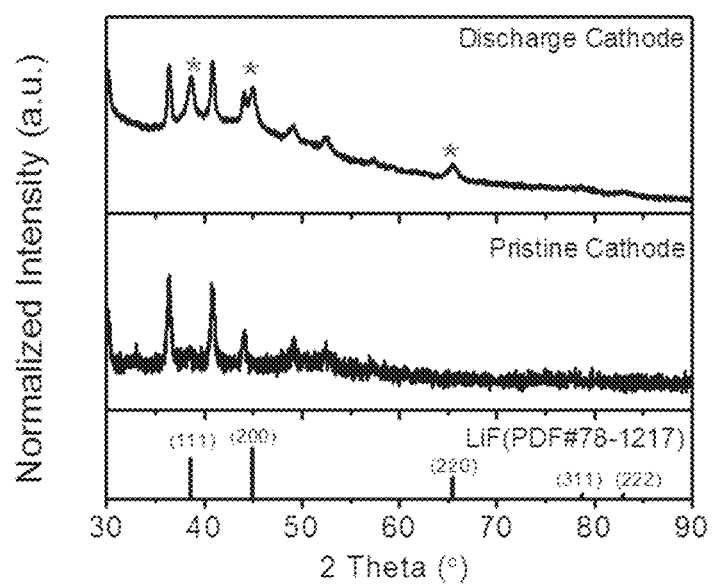
FIG. 10A shows X-ray diffraction patterns of the discharge and pristine cathode, according to one set of embodiments.
Figure 10B:
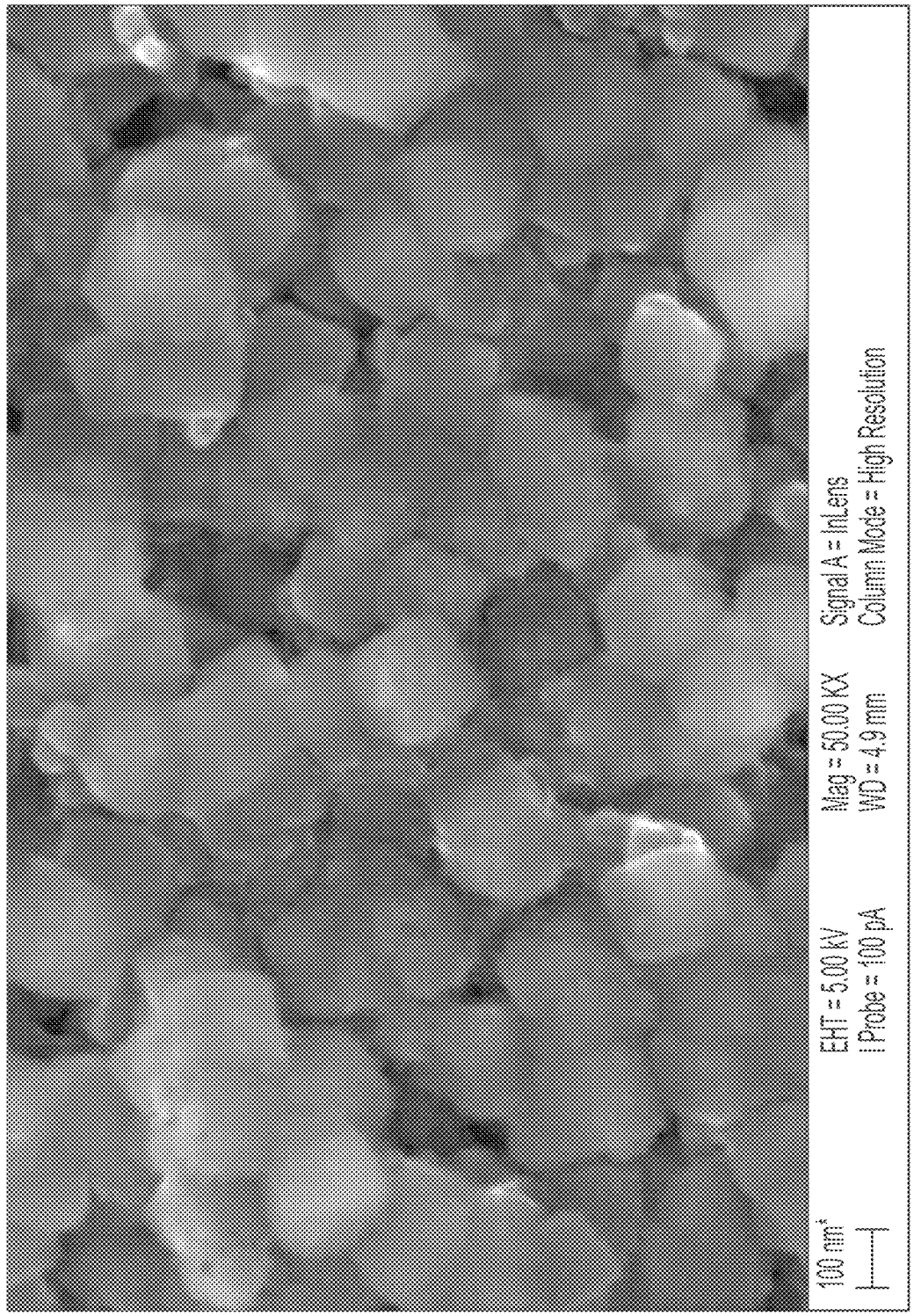
FIG. 10B shows a SEM image of a discharge cathode, according to certain embodiments.

This example describes the discharge product characterization of the Li—NF$_3$ cell from Example 3. The cathode from a Li—NF$_3$ cell after discharge was subject to x-ray diffraction (XRD), nuclear magnetic resonance (NMR), and scanning electron microscopy (SEM) measurement and the results were shown in FIG. 10. XRD pattern of the discharge cathode shows new peaks which can be indexed to the crystalline lithium fluoride (LiF) phase. The LiF amount on the discharge cathode was further quantified from $^{19}$F-NMR spectrum with an internal standard and the LiF morphology was examined as cubic-like solids using SEM. FIG. 10A shows XRD patterns of the discharge and pristine cathode. Peaks labeled with * could be assigned from the crystalline LiF phase. The $^{19}$F-NMR spectrum of D$_2$O solution soaked with the discharge cathode showed chemical shifts at −122 ppm and −77 ppm, which could be assigned to LiF species and the trifluoroethanol (CF$_3$CH$_2$OH) internal standard, respectively. FIG. 10B shows a SEM image of the discharge cathode showing the cubic-like discharge product of LiF.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
   in a sealed electrochemical cell, reacting a halogenated compound with a metal to form a metal halide, wherein the halogenated compound is a gas at standard temperature and pressure and the metal has a standard reduction potential of less than or equal to about −1.4 V vs. a standard hydrogen electrode.

2. The method of claim 1, comprising reacting the halogenated compound with the metal in an electrolyte to form the metal halide.

3. The method of claim 2, wherein the electrolyte comprises a non-aqueous solvent.

4. The method of claim 2, wherein the electrolyte comprises an organic solvent.

5. The method of claim 1, wherein the reacting step occurs at a temperature of less than or equal to about 60° C.

6. The method of claim 1, wherein the reacting step occurs at a pressure of greater than or equal to about 1 atm.

7. The method of claim 1, wherein the reacting step occurs at a cathode.

8. The method of claim 7, wherein the cathode comprises carbon, a noble metal, a transition metal, a metal oxide, or a metal fluoride.

9. The method of claim 7, wherein the cathode comprises carbon nanotubes, graphene, and/or carbon nanofibers.

10. The method of claim 1, wherein the halogenated compound is reduced during the reacting step.

11. The method of claim 1, further comprising forming a second reaction product as a result of the reacting step.

12. The method of claim 1, wherein the metal is selected from the group consisting of alkali metals and alkaline earth metals.

13. The method of claim 1, wherein the metal is lithium or sodium.

14. The method of claim 1, wherein the electrochemical cell is a galvanic cell.

15. The method of claim 1, wherein the halogenated compound is a fluorinated compound.

16. The method of claim 1, wherein the halogenated compound is selected from the group consisting of sulfur hexafluoride, nitrogen trifluoride, and perfluorinated fluorocarbons.

17. The method of claim 1, wherein the metal halide is a metal fluoride.

18. The method of claim 1, wherein the sealed electrochemical cell comprises an anode, and wherein the anode comprises a metal selected from the group consisting of alkali metals and alkaline earth metals.

19. The method of claim 18, wherein the anode comprises lithium or sodium.

20. The method of claim 1, further comprising maintaining a concentration of the gas in a headspace of the sealed electrochemical cell that allows the gas to be transported from the headspace to an electrolyte of the sealed electrochemical cell prior to, during, and/or after use of the sealed electrochemical cell.

21. A method, comprising:
   at an electrified interface of a cathode, electrochemically reacting a halogenated compound with a metal ion to form a metal halide, wherein the halogenated compound is a gas at standard temperature and pressure and the metal ion has a standard reduction potential of less than or equal to about −1.4 V vs. a standard hydrogen electrode.

22. The method of claim 21, wherein the metal ion is a lithium cation and/or a sodium cation.

23. The method of claim 21, wherein the cathode comprises carbon, a noble metal, a transition metal, a metal oxide, or a metal fluoride.

24. The method of claim 21, wherein the electrified interface of the cathode is an electrified interface between the cathode and an electrolyte.

25. The method of claim 24, wherein the halogenated compound is dissolved in the electrolyte.

* * * * *